(12) United States Patent
Shi et al.

(10) Patent No.: US 11,809,035 B2
(45) Date of Patent: Nov. 7, 2023

(54) COLOR FILM SUBSTRATE, DISPLAY PANEL AND DISPLAY DEVICE

(71) Applicant: BOE Technology Group Co., Ltd., Beijing (CN)

(72) Inventors: Ge Shi, Beijing (CN); Yujie Liu, Beijing (CN); Shi Shu, Beijing (CN); Wei Huang, Beijing (CN); Shiyu Zhang, Beijing (CN); Yuyao Wang, Beijing (CN); Yunsik Im, Beijing (CN); Xiaochuan Chen, Beijing (CN); Xue Dong, Beijing (CN); Ming Zhu, Beijing (CN); Song Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 231 days.

(21) Appl. No.: 17/298,267

(22) PCT Filed: Jan. 11, 2021

(86) PCT No.: PCT/CN2021/071049
§ 371 (c)(1),
(2) Date: May 28, 2021

(87) PCT Pub. No.: WO2021/143641
PCT Pub. Date: Jul. 22, 2021

(65) Prior Publication Data
US 2022/0317511 A1 Oct. 6, 2022

(30) Foreign Application Priority Data
Jan. 17, 2020 (CN) .......................... 202010057184.0

(51) Int. Cl.
*G02F 1/1335* (2006.01)

(52) U.S. Cl.
CPC .. *G02F 1/133514* (2013.01); *G02F 1/133512* (2013.01); *G02F 1/133548* (2021.01)

(58) Field of Classification Search
CPC ............. G02F 2/02; G02F 2001/01791; G02F 1/133512; G02F 1/133509;
(Continued)

(56) References Cited

U.S. PATENT DOCUMENTS 10,139,536 B2    11/2018   Wang et al.
10,139,537 B2    11/2018   Nielson et al.
(Continued)

FOREIGN PATENT DOCUMENTS

CN     108181678 A    6/2018
CN     108931863 A    12/2018
(Continued)

OTHER PUBLICATIONS

Extended (Supplementary) European Search Report dated Nov. 8, 2022, issued in counterpart EP application No. 21726545.3. (30 pages).
(Continued)

*Primary Examiner* — Jonathan Y Jung
(74) *Attorney, Agent, or Firm* — WHDA, LLP

(57) ABSTRACT

A color filter substrate, a display panel and a display device are provided. The color filter substrate includes: a base substrate; a color conversion layer on the base substrate; a covering layer on a side of the color conversion layer away from the base substrate; and a polarizing layer on a side of the covering layer away from the base substrate. The polarizing layer includes a wire grid polarizer. The covering layer includes a first covering sub-layer and a second covering sub-layer, the first covering sub-layer is located on the side of the color conversion layer away from the base substrate, the second covering sub-layer is located on a side of the first
(Continued)

covering sub-layer away from the base substrate, and a material of the first covering sub-layer is different from a material of the second covering sub-layer.

18 Claims, 15 Drawing Sheets

(58) Field of Classification Search
CPC ......... G02F 1/133548; G02F 1/133528; H01L 33/50; H01L 33/507; H01L 29/78633; H01L 51/5284; H05B 33/145; B82Y 30/00; C01P 2004/64
See application file for complete search history.

(56) References Cited

U.S. PATENT DOCUMENTS

| | | |
|---|---|---|
| 10,782,553 B2 | 9/2020 | Sugitani et al. |
| 2005/0231669 A1* | 10/2005 | Kim .................. G02F 1/1339 349/138 |
| 2015/0301408 A1* | 10/2015 | Li .................... G02F 1/133621 359/359 |
| 2016/0370655 A1* | 12/2016 | Nagayama ........ G02F 1/133617 |
| 2017/0242292 A1* | 8/2017 | Jeon .................. G02F 1/133617 |
| 2018/0006093 A1* | 1/2018 | Kim .................... H01L 33/06 |
| 2018/0088261 A1* | 3/2018 | Song .................... G02B 5/206 |
| 2018/0120631 A1* | 5/2018 | Lee .................... G02F 1/133617 |
| 2018/0120646 A1* | 5/2018 | Lee .................... H10K 59/38 |
| 2018/0143364 A1 | 5/2018 | Wang et al. |
| 2018/0231843 A1* | 8/2018 | Park .................. G02F 1/133512 |
| 2018/0253166 A1* | 9/2018 | Stay .................... G09G 3/3622 |
| 2018/0341147 A1 | 11/2018 | Sugitani et al. |
| 2019/0204672 A1* | 7/2019 | Choi .................. G02F 1/133512 |
| 2019/0212610 A1 | 7/2019 | Kim et al. |
| 2020/0073171 A1* | 3/2020 | Park .................... G02B 5/30 |
| 2020/0409212 A1 | 12/2020 | Yue et al. |

FOREIGN PATENT DOCUMENTS

| | | |
|---|---|---|
| CN | 109300395 A | 2/2019 |
| CN | 109906392 A | 6/2019 |
| CN | 110262114 A | 9/2019 |
| CN | 211741778 U | 10/2020 |
| JP | 2019-113816 A | 7/2019 |

OTHER PUBLICATIONS

International Search Report dated Apr. 15, 2021, issued in counterpart Application No. PCT/CN2021/071049. (4 pages).

* cited by examiner

COLOR FILM SUBSTRATE, DISPLAY PANEL AND DISPLAY DEVICE

CROSS-REFERENCE TO RELATED APPLICATION

This application claims priority to Chinese Application No. 202010057184.0, filed on Jan. 17, 2020, which is incorporated herein by reference in their entirety.

TECHNICAL FIELD

The present disclosure relates to a field of display technology, and in particular to a color filter substrate, a display panel and a display device.

BACKGROUND

Existing liquid crystal display panels usually include a color film (abbreviated as CF) substrate, an array substrate, a liquid crystal layer, and a backlight module, and the liquid crystal layer is arranged between the color film substrate and the array substrate. A color film layer (such as a color filter) is provided on the color film substrate, and the color film layer is a key component for realizing a colorful display device. Generally, the color film layer includes a plurality of color film sub-layers such as red film layer, green film layer, and blue film layer. A white light emitted by the backlight module passes through the color film layer, and the color film layer may act as a color resist to generate light of three primary colors including red, green, and blue. However, the display panel including the white backlight module and a conventional color film layer has defects such as low light efficiency, narrow color gamut, and small viewing angle.

SUMMARY

In one aspect, a color film substrate is provided, including: a base substrate; a color conversion layer on the base substrate; a covering layer on a side of the color conversion layer away from the base substrate; and a polarizing layer on a side of the covering layer away from the base substrate. The polarizing layer includes a wire grid polarizer. The covering layer includes a first covering sub-layer and a second covering sub-layer, the first covering sub-layer is located on the side of the color conversion layer away from the base substrate, the second covering sub-layer is located on a side of the first covering sub-layer away from the base substrate, and a material of the first covering sub-layer is different from a material of the second covering sub-layer.

According to some exemplary embodiments, the color filter substrate further includes a buffer layer between the covering layer and the polarizing layer, wherein the buffer layer includes a first buffer sub-layer and a second buffer sub-layer, the first buffer sub-layer is arranged on a side of the wire grid polarizer close to the base substrate, the second buffer sub-layer is arranged on a side of the first buffer sub-layer close to the base substrate, and a refractive index of a material of the first buffer sub-layer is smaller than a refractive index of a material of the second buffer sub-layer.

According to some exemplary embodiments, the color filter substrate further includes a protective layer on a side of the polarizing layer away from the base substrate, wherein the protective layer includes a first protective sub-layer and a second protective sub-layer, the first protective sub-layer is arranged on a side of the wire grid polarizer away from the base substrate, the second protection sub-layer is arranged on a side of the first protection sub-layer away from the base substrate, and a refractive index of a material of the first protective sub-layer is smaller than a refractive index of a material of the second protective sub-layer.

According to some exemplary embodiments, the color filter substrate further includes a filter layer on a side of the color conversion layer close to the base substrate. The filter layer includes a first filter structure, a second filter structure, and a third filter structure, the first filter structure is configured to filter light within a first wavelength range, the second filter structure is configured to filter light within a second wavelength range, the third filter structure is configured to filter light within a third wavelength range, and the first wavelength range, the second wavelength range, and the third wavelength range are different from one another.

According to some exemplary embodiments, the color conversion layer includes a first quantum dot structure and a second quantum dot structure, the first quantum dot structure is configured to convert the light within the third wavelength range into the light within the first wavelength range, the second quantum dot structure is configured to convert the light within the third wavelength range into the light within the second wavelength range. The color filter substrate includes a plurality of pixels, each pixel includes at least a first sub-pixel, a second sub-pixel and a third sub-pixel, the first sub-pixel includes the first quantum dot structure and the first filter structure, the second sub-pixel includes the second quantum dot structure and the second filter structure, and the third sub-pixel includes the third filter structure.

According to some exemplary embodiments, the third sub-pixel further includes a transparent structure, the transparent structure is configured to allow the light within the third wavelength range, that is incident thereon, to pass therethrough, and the transparent structure is located on a side of the third filter structure away from the base substrate.

According to some exemplary embodiments, an orthographic projection of the first quantum dot structure on the base substrate falls within an orthographic projection of the first filter structure on the base substrate, and an orthographic projection of the second quantum dot structure on the base substrate falls within an orthographic projection of the second filter structure on the base substrate.

According to some exemplary embodiments, an orthographic projection of the transparent structure on the base substrate falls within an orthographic projection of the third filter structure on the base substrate.

According to some exemplary embodiments, a thickness of the first filter structure is equal to a thickness of the second filter structure, a thickness of the first quantum dot structure is equal to a thickness of the second quantum dot structure, a thickness of the third filter structure is equal to a sum of thicknesses of the first filter structure and the first quantum dot structure, and the thickness of the first filter structure is smaller than the thickness of the first quantum dot structure.

According to some exemplary embodiments, a thickness of the first filter structure, a thickness of the second filter structure, and a thickness of the third filter structure are equal to one another, a thickness of the first quantum dot structure, a thickness of the second quantum dot structure and a thickness of the transparent structure are equal to one another, and the thickness of the first filter structure is smaller than the thickness of the first quantum dot structure.

According to some exemplary embodiments, a thickness of the first covering sub-layer is greater than a thickness of the second covering sub-layer.

According to some exemplary embodiments, the second covering sub-layer at least includes a photoinitiator.

According to some exemplary embodiments, a pitch of the wire grid polarizer is within a range of 100~140 nm; and/or, a duty ratio of the wire grid polarizer is 0.5; and/or, a thickness of the wire grid polarizer is within a range of 150~200 nm.

According to some exemplary embodiments, a thickness of the first buffer sub-layer is within a range of 275.5~304.5 nm, and a thickness of the second buffer sub-layer is within a range of 95~105 nm; and/or, a thickness of the first protective sub-layer is within a range of 427.5~472.5 nm, and a thickness of the second protective sub-layer is within a range of 47.5~52.5 nm.

According to some exemplary embodiments, the first buffer sub-layer and the first protection sub-layer are both silicon oxide layers; and/or, the second buffer sub-layer and the second protection sub-layer are both silicon nitride layers.

According to some exemplary embodiments, the refractive indices of the first buffer sub-layer and the first protective sub-layer are both within a range of 1.35~1.65; and/or, the refractive indices of the second buffer sub-layer and the second protection sub-layer are both within a range of 1.6~2.0.

According to some exemplary embodiments, the color filter substrate further includes a black matrix and an isolation bank, the black matrix is located on a side of the filter layer close to the base substrate, and the isolation bank is located on a side of the black matrix away from the base substrate, so that a plurality of grooves are formed on a side of the filter layer away from the base substrate. The plurality of grooves include a first groove in the first sub-pixel and a second groove in the second sub-pixel, the first quantum dot structure is located in the first groove, and the second quantum dot structure is located in the second groove.

According to some exemplary embodiments, the color filter substrate further includes a black matrix, an isolation bank and a planarization layer, the black matrix is located on a side of the filter layer close to the base substrate, the planarization layer is located on a side of the filter layer away from the base substrate, and the isolation bank is located on a side of the planarization layer away from the base substrate, so that a plurality of grooves are formed on the side of the planarization layer away from the base substrate; and the plurality of grooves include a first groove in the first sub-pixel and a second groove in the second sub-pixel, the first quantum dot structure is located in the first groove, and the second quantum dot structure is located in the second groove.

According to some exemplary embodiments, the isolation bank includes a first isolation bank top surface away from the base substrate, the first quantum dot structure includes a first top surface away from the base substrate, the second quantum dot structure includes a second top surface away from the base substrate, and the first isolation bank top surface is farther from the base substrate than each of the first top surface and the second top surface.

According to some exemplary embodiments, the color filter substrate further includes a barrier layer, wherein the barrier layer is located between the covering layer and a layer where the first quantum dot structure and the second quantum dot structure are located.

According to some exemplary embodiments, an orthographic projection of the isolation bank on the base substrate overlaps an orthographic projection of the black matrix on the base substrate.

According to some exemplary embodiments, the first quantum dot structure includes a first bottom surface close to the base substrate and a first top surface away from the base substrate, and an orthographic projection of the first bottom surface on the base substrate falls within an orthographic projection of the first top surface on the base substrate; and/or, the second quantum dot structure includes a second bottom surface close to the base substrate and a second top surface away from the base substrate, and an orthographic projection of the second bottom surface on the base substrate falls within the orthographic projection of the second top surface on the base substrate.

According to some exemplary embodiments, the thickness of each of the first quantum dot structure and the second quantum dot structure is within a range of 5~15 μm.

According to some exemplary embodiments, the color filter substrate further includes an alignment layer, and the alignment layer is located on a side of the second protection sub-layer away from the base substrate.

In another aspect, a display panel is provided, wherein the display panel includes the color filter substrate.

According to some exemplary embodiments, the display panel further includes: an array substrate opposite to the color filter substrate; a liquid crystal layer between the color filter substrate and the array substrate; and a backlight module on a side of the array substrate away from the liquid crystal layer, wherein the backlight module emits blue light.

In yet aspect, a display device is provided, the display device includes the display panel.

BRIEF DESCRIPTION OF THE DRAWINGS

Through following description of the present disclosure with reference to drawings, purposes and advantages of the present disclosure will be apparent and a comprehensive understanding of the present disclosure could be obtained.

Figure 1:
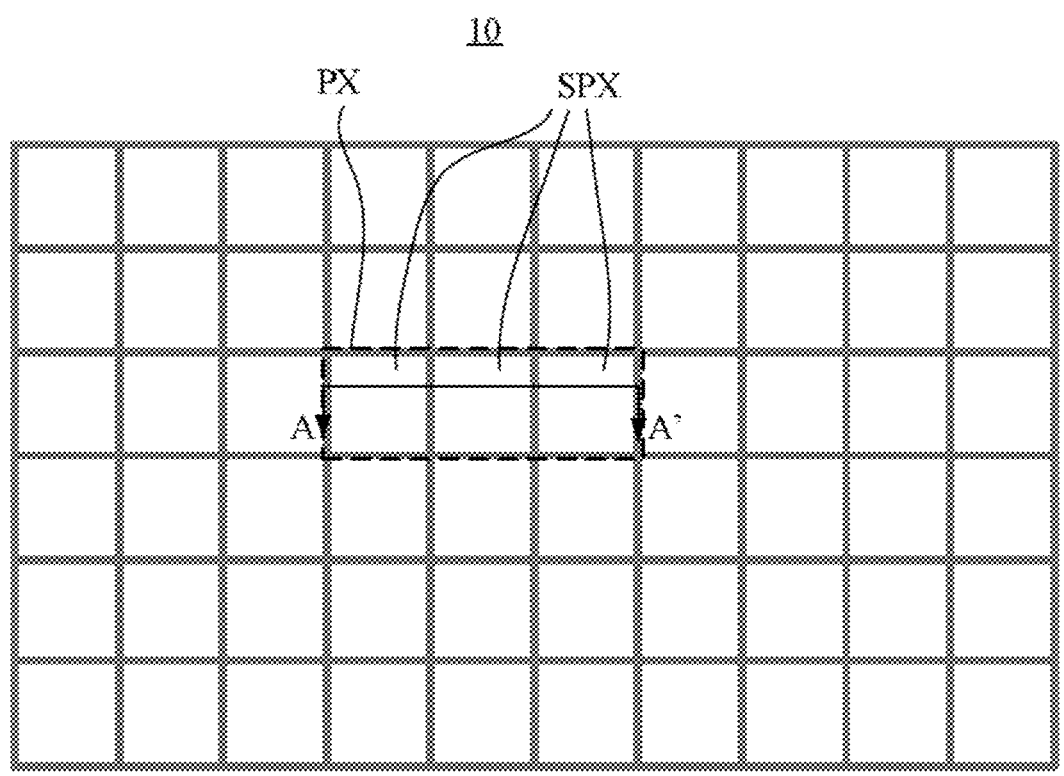
FIG. 1 is a schematic plan view of a color filter substrate according to embodiments of the present disclosure.

It should be noted that, for clarity, sizes of layers, structures, or regions may be enlarged or reduced in drawings of the embodiments of the present disclosure, that is, drawings are not drawn according to actual scale.

DETAILED DESCRIPTION OF EMBODIMENTS

The technical solutions of the present disclosure will be further described in detail through embodiments and in conjunction with drawings. In specification, the same or similar reference numerals indicate the same or similar components. The following description of the embodiments of the present disclosure with reference to the drawings is intended to explain a general inventive concept of the present disclosure, and should not be construed as a limitation to the present disclosure.

In addition, Hereinafter detailed description, for convenience of explanation, many specific details are set forth to provide a comprehensive understanding of the embodiments of the present disclosure. However, obviously, one or more embodiments may also be implemented without the specific details.

It should be noted that "on", "formed on" and "arranged on" may mean that one layer is directly formed or arranged on another layer, or it may mean that a layer is indirectly formed or arranged on another layer, that is, a middle layer may exist.

It should be noted that although the terms "first", "second", etc. may be used herein to describe various components, members, elements, regions, layers and/or parts, but the components, members, elements, regions, layers and/or parts should not be limited by the terms. The terms are used to distinguish one component, member, element, region, layer, and/or part from another. Thus, for example, the first component, the first member, the first element, the first region, the first layer and/or the first part discussed below may be referred to as the second component, the second member, the second element, the second region, the second layer and/or the second part without departing from teachings of the present disclosure.

It should be noted that, in this context, an expression "thickness" means a size in a light emitting direction (a direction perpendicular to a surface of a base substrate of a color filter substrate on which a color conversion layer is provided, that is, Y direction shown in drawings) of the color filter substrate or a display panel; an expression "width" means a size in a direction (that is, X direction shown in drawings) that is perpendicular to the light emitting direction (a direction parallel to the surface of the base substrate of the color filter substrate on which the color conversion layer is provided) of the color filter substrate or the display panel and is parallel to a row direction of a pixel array on the color filter substrate or the display panel.

Figure 2:
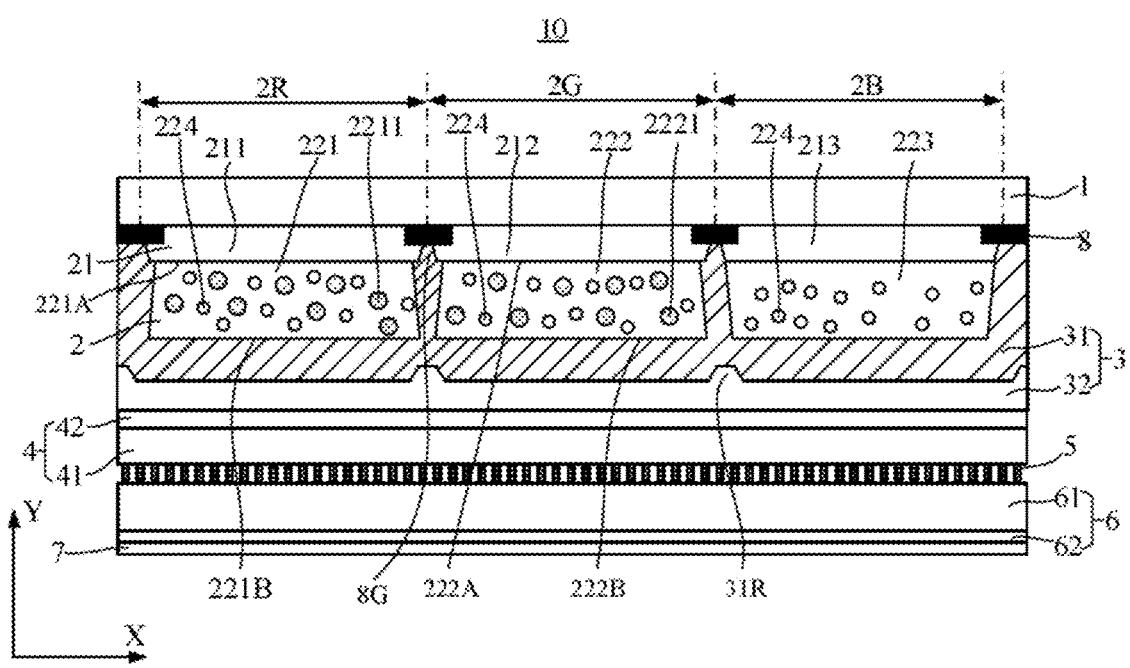
FIG. 2 is a schematic cross-sectional view of the color filter substrate, taken along the line AA' in FIG. 1, according to embodiments of the present disclosure.

FIG. 1 is a schematic plan view of a color filter substrate according to embodiments of the present disclosure, and FIG. 2 is a schematic cross-sectional view, taken along line AA' in FIG. 1, of the color filter substrate according to embodiments of the present disclosure. Referring to FIGS. 1 and 2, the color filter substrate 10 according to the embodiments of the present disclosure may include a base substrate 1, a color conversion layer 2, a covering layer 3, a buffer layer 4, a polarizing layer 5 and a protective layer 6. The color conversion layer 2, the covering layer 3, the buffer layer 4, the polarizing layer 5 and the protective layer 6 are sequentially arranged on the base substrate 1 in a direction away from the base substrate 1. That is, the color conversion layer 2 is arranged on the base substrate 1, the covering layer 3 is arranged on a side of the color conversion layer 2 away from the base substrate 1, the buffer layer 4 is arranged on a side of the covering layer 3 away from the base substrate 1, the polarizing layer 5 is arranged on a side of the buffer layer 4 away from the base substrate 1, and the protective layer 6 is arranged on a side of the polarizing layer 5 away from the base substrate 1.

Figure 3:
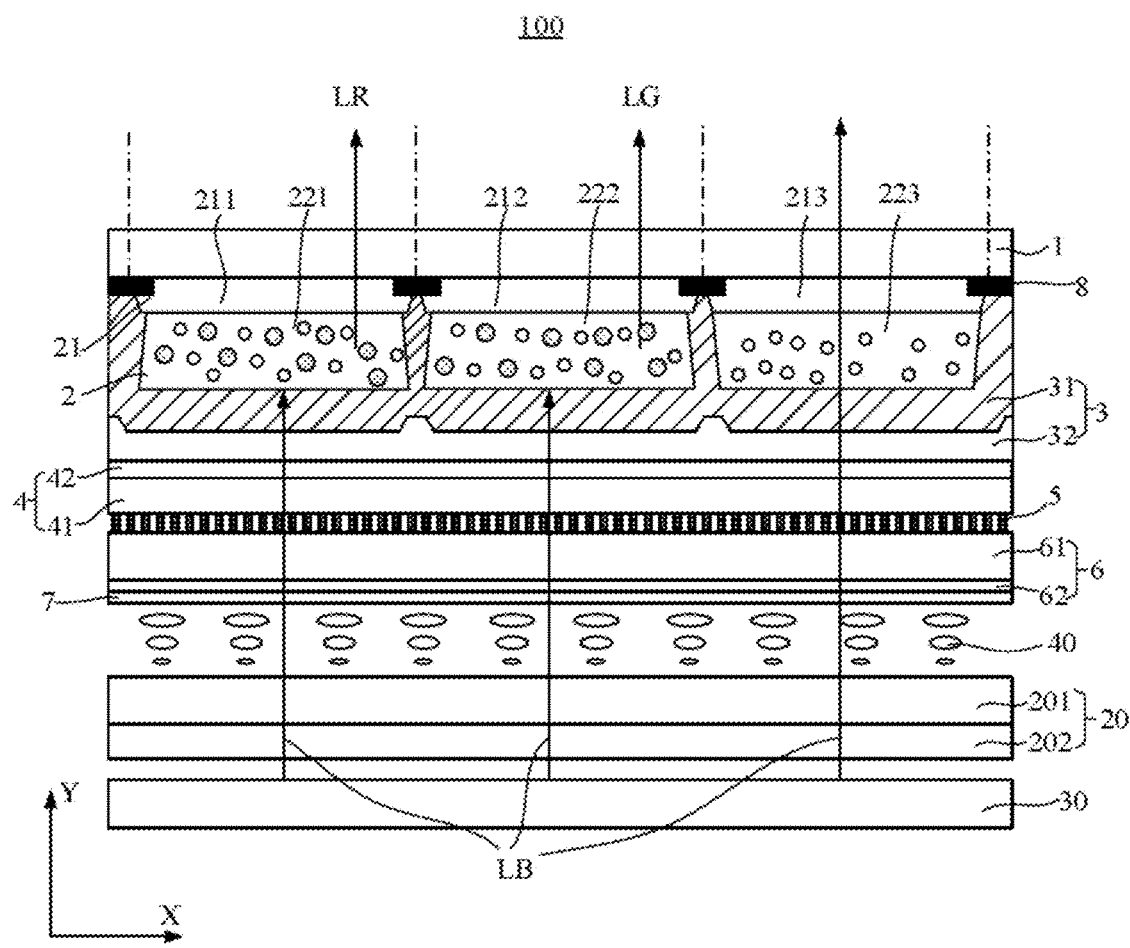
FIG. 3 is a schematic structural view of a display panel according to embodiments of the present disclosure.

FIG. 3 is a schematic structural view of a display panel according to embodiments of the present disclosure. Referring to FIG. 2, the display panel 100 may include a color filter substrate 10, an array substrate 20, a backlight module 30, and a liquid crystal layer 40 sandwiched between the color filter substrate 10 and the array substrate 20. It should be understood that the color filter substrate 10 is a color filter substrate according to any one of the embodiments of the present disclosure.

In the embodiments of the present disclosure, the base substrate 1 may be a rigid base substrate or a flexible base substrate, including but not limited to a glass base substrate or a polyimide (PI) base substrate.

In the embodiments of the present disclosure, referring to FIGS. 1 and 2 in combination, the color filter substrate 10 may include a plurality of pixels PX, for example, an area surrounded by a dashed frame. It should be understood that the plurality of pixels PX may be arranged in an array, that is, there are multiple rows and multiple columns. In FIG. 1, only a part of the pixels of the color filter substrate 10 are schematically shown, but not all the pixels. In FIG. 1, a horizontal direction may be referred to as a row direction, and a vertical direction may be referred to as a column direction. Each pixel PX may include a plurality of sub-pixels SPX for emitting different colors. For example, the plurality of sub-pixels SPX may emit different colors such as red, green, blue, yellow, etc., to achieve colorful display. For example, the color filter substrate according to the embodiments of the present disclosure may include at least three sub-pixels SPX, for example, the three sub-pixels SPX may include a first sub-pixel 2R, a second sub-pixel 2G and a third sub-pixel 2B. The first sub-pixel 2R is configured to emit light within a first wavelength range, the second sub-pixel 2G is configured to emit light within a second wavelength range, and the third sub-pixel 2B is configured to emit light within a third wavelength range.

It should be noted that, in FIG. 1, in order to clearly show patterns such as a dashed frame and a hatched line, a black matrix is shown with a gray line, but this is not a limitation to embodiments of the present disclosure.

In the embodiments of the present disclosure, unless otherwise specified, the first wavelength range, the second wavelength range and the third wavelength range are different from one another. For example, the first wavelength range, the second wavelength range and the third wavelength range may correspond to a first color, a second color, and a third color, respectively. For another example, the first color, the second color and the third color may refer to red, green, and blue, respectively. Of course, the color filter substrate may also include pixels for emitting other colors, such as pixels for emitting yellow light, which are not particularly limited in the embodiments of the present disclosure.

As shown in FIG. 2, the color conversion layer 2 may include at least a quantum dot structure. Specifically, the color conversion layer 2 may include a plurality of quantum dot structures for emitting different colors. For example, the first sub-pixel 2R may include a first quantum dot structure 221 for emitting light within the first wavelength range, and the second sub-pixel 2G may include a second quantum dot structure 222 for emitting light within the second wavelength range. Of course, the color conversion layer 2 may also include a quantum dot structure for emitting light within other wavelength ranges, for example, a quantum dot structure for emitting yellow light.

In the context, an expression "quantum dot (abbreviated as QD)" is a semiconductor nanostructure that binds excitons in three spatial directions. Those skilled in the art should understand that the quantum dot has the following characteristics: when the quantum dot is excited by light of a predetermined wavelength, the quantum dot may convert the light of the predetermined wavelength into light of another predetermined wavelength, and a wavelength of the light of another predetermined wavelength may be determined by factors such as a constituent material of the quantum dot, a shape of the quantum dot, and a size of the quantum dot.

For example, the first quantum dot structure 221 may be configured to convert the light within the third wavelength range (for example, blue light) into the light within the first wavelength range (for example, red light), and the second quantum dot structure 222 may be configured to convert the light within the third wavelength range (for example, blue light) into the light within the second wavelength range (for example, green light).

It should also be understood that, in the context, the quantum dot structure may include a plurality of quantum dots, for example, the first quantum dot structure 221 may include a plurality of first quantum dots 2211, and each of the first quantum dots 2211 may be configured to convert light of the third color into light of the first color. The second quantum dot structure 222 may include a plurality of second quantum dots 2221, and each of the second quantum dots 2221 may be configured to convert the light of the third color into light of the second color.

For example, the material of the quantum dot may be the quantum dot material commonly used in the art, including but not limited to one or more selected from following materials: CdS, CdSe, CdTe, ZnO, ZnS, ZnSe, ZnTe, GaAs, GaP, GaSb, HgS, HgSe, HgTe, InAs, InP, InSb, AlAs, AlP, CuInS, CuInSe and AlSb. Of course, the material of the quantum dot includes but is not limited to those listed above, and other materials that are the same as or similar to the above substances may also be applied. Those skilled in the art should also understand that an emission spectrum of the quantum dot may be controlled by changing the size of the quantum dot, that is, the quantum dot is formed into different sizes and may emit light of different colors. Taking zinc sulfide (ZnS) quantum dot as an example, the size of the quantum dot for emitting red light is mainly about 9-10 mu, the size of the quantum dot for emitting yellow light is about 8 nm, and the size of the quantum dot for emitting green light is about 7 nm.

In some exemplary embodiments of the present disclosure, referring to FIGS. 2 and 3 in combination, the third sub-pixel 2B may include a transparent structure 223. The transparent structure 223 is configured to allow the light that is incident thereon to pass therethrough. For example, the transparent structure 223 of the third sub-pixel 2B may be configured to allow the light that is incident thereon and is within the third wavelength range (for example, blue light) to pass therethrough.

In the embodiments of the present disclosure, the quantum dot structure may be formed by a photolithography process. Optionally, a thickness of the quantum dot structure may be in a range of 5~15 μm. For example, in embodiments of the present disclosure, thicknesses of the first quantum dot structure 221, the second quantum dot structure 222 and the transparent structure 223 may be equal to one another, and all fall within a range of 5~15 μm.

Referring to FIGS. 2 and 3 in combination, the backlight module 30 may include a backlight source that emits the light within the third wavelength range (for example, blue light), such as a blue LED. For example, the backlight source of the backlight module 30 may emit blue light with a center wavelength of 450 nm and a full width at half maximum of 30~40 nm.

As shown in FIG. 3, the color filter substrate 10 is arranged on a light emitting side of the backlight module 30. Referring to FIGS. 2 and 3 in combination, when the blue light LB emitted by the backlight module 30 is incident onto the quantum dot structures 221, 222 and the transparent structure 223, the first quantum dot structure 221 may emit red light under the excitation of blue light, that is, convert blue light into red light; the second quantum dot structure 222 may emit green light under the excitation of blue light, that is, convert blue light into green light; and the blue light directly passes through the transparent structure 223. In this way, the first sub-pixel 2R emits red light, the second sub-pixel 2G emits green light, and the third sub-pixel 2B emits blue light, so that the display panel according to the embodiments of the present disclosure may implement colorful display.

In the color filter substrate, the display panel, and a display device according to the embodiments of the present disclosure, the color conversion layer of the color film substrate includes the quantum dot structure, and advantages of quantum dots may implement the display panel and the display device with a high color gamut and a large viewing angle.

Optionally, in the embodiments of the present disclosure, the first quantum dot structure 221, the second quantum dot structure 222, and/or the transparent structure 223 may also be provided with scattering particles 224 (refer to FIG. 2) to improve conversion efficiency for blue light, thereby improving light efficiency of the display panel. For example, in the embodiments shown in FIG. 2, a plurality of scattering particles 224 are provided in the first quantum dot structure 221, the second quantum dot structure 222 and the transparent structure 223. The scattering particles 224 may scatter blue light, which may effectively increase an optical path of blue light in the quantum dot structures and the transparent structure, and increase a probability of blue light incident onto each quantum dot, thereby increasing conversion ratio of blue light into red light and green light. Meanwhile, more blue light may pass through the transparent structure 223. In this way, an overall light efficiency and viewing angle of the display panel may be improved.

For example, a particle size of the scattering particles 224 may be in a range of 60~500 nm, and a distribution concentration of the scattering particles 224 may be in a range of 1%~15%. The distribution concentration of the scattering particles 224 may be represented by a volume percentage of the scattering particles in the quantum dot structure or the transparent structure.

Continuing to refer to FIG. 2, the color filter substrate 10 may further include a filter layer 21, and the filter layer 21 is arranged between the base substrate 1 and a layer where the quantum dot structures and the transparent structure are located. The filter layer 21 may include a plurality of filter structures for allow light of different colors to pass through. For example, the plurality of filter structures may be arranged in one-to-one correspondence with the plurality of sub-pixels. As shown in FIG. 2, the filter layer 21 may include a first filter structure 211, a second filter structure 212 and a third filter structure 213. It should be understood that the first sub-pixel 2R includes the first filter structure 211, the second sub-pixel 2G includes the second filter structure 212, and the third sub-pixel 2B includes the third filter structure 213. The first filter structure 211 is configured to allow the light of the first color to pass through, the second filter structure 212 is configured to allow the light of the second color to pass through, the third filter structure 213 is configured to allow the light of the third color to pass through.

Specifically, the first filter structure 211 is arranged corresponding to the first quantum dot structure 221, that is, the first sub-pixel 2R includes the first filter structure 211 and the first quantum dot structure 221. An orthographic projection of the first quantum dot structure 221 on the base substrate 1 falls within an orthographic projection of the first filter structure 211 on the base substrate 1, for example, an area of the orthographic projection of the first quantum dot structure 221 on the base substrate 1 is smaller than an area of the orthographic projection of the first filter structure 211 on the base substrate 1. As shown in FIG. 2, a thickness of the first filter structure 211 may be smaller than a thickness of the first quantum dot structure 221. For example, the thickness of the first filter structure 211 may be in a range of 1.5~3.0 μm, and the thickness of the first quantum dot structure 221 may be in a range of 5~15 μm.

The second filter structure 212 is arranged corresponding to the second quantum dot structure 222, that is, the second sub-pixel 2G includes the second filter structure 212 and the second quantum dot structure 222. An orthographic projection of the second quantum dot structure 222 on the base substrate 1 falls within an orthographic projection of the second filter structure 212 on the base substrate 1, for example, an area of the orthographic projection of the second quantum dot structure 222 on the base substrate 1 is smaller than an area of the orthographic projection of the second filter structure 212 on the base substrate 1. As shown in FIG. 2, a thickness of the second filter structure 212 may be less than a thickness of the second quantumn dot structure 222. For example, the thickness of the second filter structure 212 may be in a range of 1.5~3.0 μm, and the thickness of the second quantum dot structure 222 may be in a range of 5~15 μm.

The third filter structure 213 is arranged corresponding to the transparent structure 223, that is, the third sub-pixel 2B includes the third filter structure 213 and the transparent structure 223. An orthographic projection of the transparent structure 223 on the base substrate 1 falls within an orthographic projection of the third filter structure 213 on the base substrate 1, for example, an area of the orthographic projection of the transparent structure 223 on the base substrate 1 is smaller than an area of the orthographic projection of the third filter structure 213 on the base substrate 1. As shown in FIG. 2, a thickness of the third filter structure 213 may be less than a thickness of the transparent structure 223. For example, the thickness of the third filter structure 213 may be in a range of 1.5~3.0 μm, and the thickness of the transparent structure 223 may be in a range of 5~15 μm.

As shown in FIG. 2, the filter layer 21 may be arranged between the base substrate 1 and the layer where the quantum dot structures and the transparent structure are located, that is, the filter layer 21 may be arranged on a light emitting side of the quantum dot structures and the transparent structure. As described above, the first quantum dot structure 221 and the second quantum dot structure 223 may convert blue light into red light and green light, respectively. In addition, there is some blue light that has not been converted by the first quantum dot structure 221 and the second quantum dot structure 223. By providing the filter layer 21, the unconverted blue light may be absorbed, which prevents red light emitted from the first sub-pixel and green light emitted from the second sub-pixel from being mixed with blue light, thereby further improving color gamut of the display panel. Furthermore, the filter layer 21 may also absorb external light to avoid poor display caused by external light exciting the quantum dot structure.

In the embodiments of the present disclosure, the thicknesses of the first filter structure 211, the second filter structure 212 and the third filter structure 213 are equal to one another, and the thicknesses may be set in a range of 1.5~3.0 μm. With such an arrangement, the filter layer may meet requirements of sRGB 100% color gamut.

As described above, the thicknesses of the first quantum dot structure 221, the second quantum dot structure 222, and the transparent structure 223 may be equal to one another. The thickness of the first filter structure 211 is smaller than the thickness of the first quantum dot structure 221, the thickness of the second filter structure 212 is smaller than the thickness of the second quantum dot structure 222, and the thickness of the third filter structure 213 is smaller than the thickness of the transparent structure 223. In actual manufacturing process, the same mask may be configured to manufacture the corresponding filter structure and quantum dot structure. Since the filter structure and the quantum dot structure are made of different materials, and the thickness of the quantum dot structure is relatively large, incomplete curing may occur when the quantum dot structure is manufactured. In this way, part of the material on a side of the quantum dot structure close to the base substrate 1 is easily peeled off. Therefore, the actually manufactured filter structure and quantum dot structure have different cross-sectional shapes.

As shown in FIG. 2, the first filter structure 211 may be a trapezoidal structure, Specifically, the first filter structure 211 has a cross-section perpendicular to light-emitting direction (Y direction in figure), a cross-sectional area of the first filter structure 211 gradually decreases in the direction away from the base substrate 1.

Continuing to refer to FIG. 2, the first quantum dot structure 221 includes a first bottom surface 221A close to the base substrate 1 and a first top surface 221B away from the base substrate 1. An orthographic projection of the first bottom surface 221A of the first quantum dot structure 221 on the base substrate 1 falls within an orthographic projection of the first top surface 221B of the first quantum dot structure 221 on the base substrate 1, and an area of the first bottom surface 221A of the first quantumn dot structure 221 is smaller than an area of the first top surface 221B of the first quantum dot structure 221. In this way, an orthographic projection of the first quantum dot structure 221 on the base substrate 1 falls within an orthographic projection of the first filter structure 211 on the base substrate 1, and an area of the orthographic projection of the first quantum dot structure 221 on the base substrate 1 is smaller than an area of the orthographic projection of the first filter structure 211 on the base substrate 1.

Similarly, the second quantum dot structure 222 includes a second bottom surface 222A close to the base substrate 1 and a second top surface 222B away from the base substrate 1. An orthographic projection of the second bottom surface 222A of the second quantum dot structure 222 on the base substrate 1 falls within an orthographic projection of the second top surface 222B of the second quantum dot structure 222 on the base substrate 1, and an area of the second bottom surface 222A of the second quantum dot structure 222 is smaller than an area of the second top surface 222B of the second quantum dot structure 222. In this way, an orthographic projection of the second quantum dot structure 222 on the base substrate 1 falls within an orthographic projection of the second filter structure 212 on the base substrate 1, and an area of the orthographic projection of the second quantum dot structure 222 on the base substrate 1 is smaller than an area of the orthographic projection of the second filter structure 212 on the base substrate 1.

Optionally, referring to FIG. 2, the color filter substrate 10 may further include a black matrix 8. It should be understood that the black matrix 8 is configured to separate pixels and prevent light leakage and cross-color.

It should be understood that an arrangement of the black matrix 8 may refer to an arrangement of the black matrix in conventional color filter substrate, which will not be repeated here.

Figure 4:
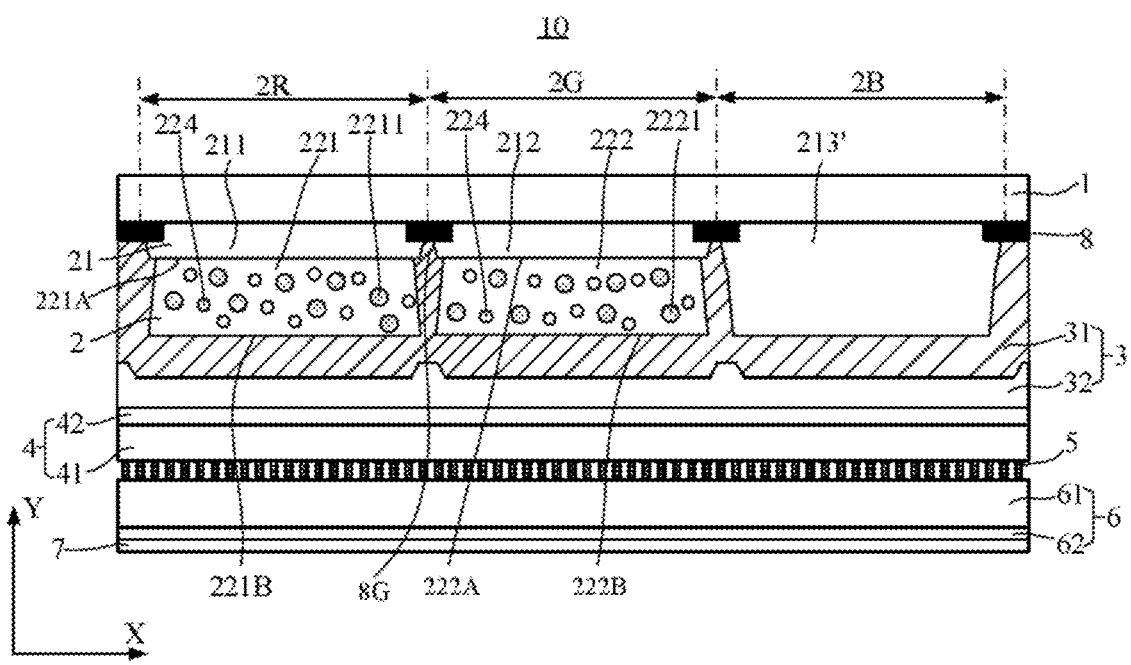
FIG. 4 is a schematic structural view of a color filter substrate according to embodiments of the present disclosure.

FIG. 4 is a schematic structural view of a color filter substrate according to embodiments of the present disclosure. Hereinafter, differences between the embodiments shown in FIG. 4 and the above embodiments will be mainly described, and other structures in embodiments shown in FIG. 4 may refer to the above embodiments.

Referring to FIG. 4, a first sub-pixel 2R includes a first filter structure 211 and a first quantum dot structure 221, a second sub-pixel 2G includes a second filter structure 212 and a second quantum dot structure 222, a third sub-pixel 2B includes a third filter structure 213'.

A thickness of the first filter structure 211 may be equal to a thickness of the second filter structure 212, for example, in a range of 1.5~3.0 μm. A thickness of the first quantum dot structure 221 may be equal to a thickness of the second quantum dot structure 222, for example, in a range of 5~15 μm. A thickness of the third filter structure 213' may be equal to a sum of the thickness of the first filter structure 211 and the thickness of the first quantum dot structure 221.

In other words, in the embodiments, in the third sub-pixel 2B, an integral third filter structure 213' is provided, instead of the filter structure combined with the transparent structure. In this way, the third filter structure 213' may allow the light of third color (for example, blue light) to pass therethrough.

It should be understood that the third filter structure 213' may also be doped with scattering particles 224. For example, the particle size of the scattering particles 224 may be in a range of 60~500 nm, and the distribution concentration of the scattering particles 224 may be in a range of 1%~15%. The distribution concentration of the scattering particles 224 may be represented by a volume percentage of the scattering particles in the quantum dot structure or the transparent structure.

Referring to FIGS. 2 to 4, there is a gap 8G between two adjacent sub-pixels. That is, the first filter structure 211 and the first quantum dot structure 221 of the first sub-pixel 2R are respectively arranged at intervals relative to the second filter structure 212 and the second quantum dot structure 222 of the second sub-pixel 2G. The second filter structure 212 and the second quantum dot structure 222 of the second sub-pixel 2G are respectively arranged at intervals relative to the third filter structure 213 and the transparent structure 223 of the third sub-pixel 2B. Due to the gap 8G, there is a difference in height between adjacent sub-pixels. For example, the difference in height may be in a range of 5~15 μm.

Referring to FIG. 2, the covering layer 3 may include a first covering sub-layer 31 and a second covering sub-layer 32. The first covering sub-layer 31 is arranged on a surface of a layer where the quantum dot structure and the transparent structure are located away from the base substrate 1, and the first covering sub-layer 31 is filled in the gap 8G. The second covering sub-layer 32 is arranged on a surface of the first covering sub-layer 31 away from the base substrate 1. By providing the covering layer, the difference in height may be eliminated to form a flattened surface.

In embodiments of the present disclosure, a material of the first covering sub-layer 31 may be different from a material of the second covering sub-layer 32.

The first cover sub-layer 31 may be a thermally cured covering layer. That is, the first covering sub-layer 31 may be cured by heating, for example, a curing temperature may be about 150° C. Exemplarily, main components of material of the thermally cured covering layer may include silicone resin, acrylic resin, isopropanol, hardener, silicon dioxide, and the like. A thickness of the first covering sub-layer 31 may be in a range of 3~7 μm. The inventor found through research that there is a large difference in height between sub-pixels, and the difference in height may be eliminated by providing the first covering sub-layer 31. Referring to FIG. 2, although the surface of the first covering sub-layer 31 away from the base substrate 1 is still uneven, a depth of a recess 31R (corresponding to the gap 8G) in the surface is much smaller than the difference in height, that is, the large difference in height at the gap 8G is eliminated to a certain extent.

The second covering sub-layer 32 may be a light-curing covering layer, for example, an ultraviolet light-curing covering layer. Exemplarily, main components of material of the light-curing covering layer may include acrylic resin, isopropanol, hardener, silicon dioxide, photoinitiator, and the like. A thickness of the second covering sub-layer 32 may be in a range of 2~3 μm. In the embodiments of the present disclosure, a leveling property of a material of the second covering sub-layer 32 is greater than a leveling property of a material of the first covering sub-layer 31. The second cover sub-layer 32 may be formed through a nanoimprint process. The second covering sub-layer 32 may further eliminate the difference in height. For example, the second covering sub-layer 32 may be flattened by a nanoimprinting device, and then cured by ultraviolet light, so that the difference in height may meet the requirements of the NIL process (i.e., nanoimprinting process). For example, after planarization through the first covering sub-layer 31 and the second covering sub-layer 32, the difference in height may be reduced to several tens of nanometers, that is, the difference in height is less than or equal to 100 nanometers.

It should be noted that in the embodiments of the present disclosure, the term "leveling property" refers to an ability of covering material to flow evenly without pores on a surface of covered material. For example, the leveling property may be expressed by time required for covering material to reach an even surface.

In the embodiments of the present disclosure, by providing two covering sub-layers 31 and 32 with different materials, the large difference in height may be substantially eliminated. For example, the difference in height may be reduced to several tens of nanometers, thereby facilitating formation of subsequent film layers.

In the embodiments of the present disclosure, the thickness of the first covering sub-layer 31 is greater than or equal to the thickness of the second covering sub-layer 32. Exemplarily, the thickness of the first covering sub-layer 31 may be 1~4 times the thickness of the second covering sub-layer 32. For example, the thickness of the first covering sub-layer 31 may be twice the thickness of the second covering sub-layer 32. Through such thickness matching, the difference in height may be eliminated, so that a surface of the covering layer away from the base substrate is relatively flat.

Referring to FIG. 2, the polarizing layer 5 is arranged on a side of the quantum dot structures 221 and 222 away from the base substrate 1, that is, the polarizing layer 5 is located on a light incident side of the quantum dot structures 221 and 222. Since the quantum dot structures 221 and 222 have a depolarization function, if an upper polarizer is arranged on a light emitting side of the quantum dot structures 221 and 222, a gray scale may not be adjusted. In the embodiments of the present disclosure, by arranging the polarizing layer 5 on the light incident side of the quantum dot structures 221 and 222, the gray scale display of the display panel may be implemented.

In the embodiments of the present disclosure, the polarizing layer 5 may be a wire grid polarizer. Compared with a conventional polarizer, the wire grid polarizer 5 may increase a transmittance of a backlight such as blue light, thereby further improving light efficiency.

Further referring to FIG. 2, the buffer layer 4 and the protective layer 6 are respectively located on upper and lower sides of the wire grid polarizer 5. That is, the buffer layer 4 is provided on a side of the wire grid polarizer 5 close to the base substrate 1, and the protective layer 6 is provided on a side of the wire grid polarizer 5 away from the base substrate 1.

Figure 5:
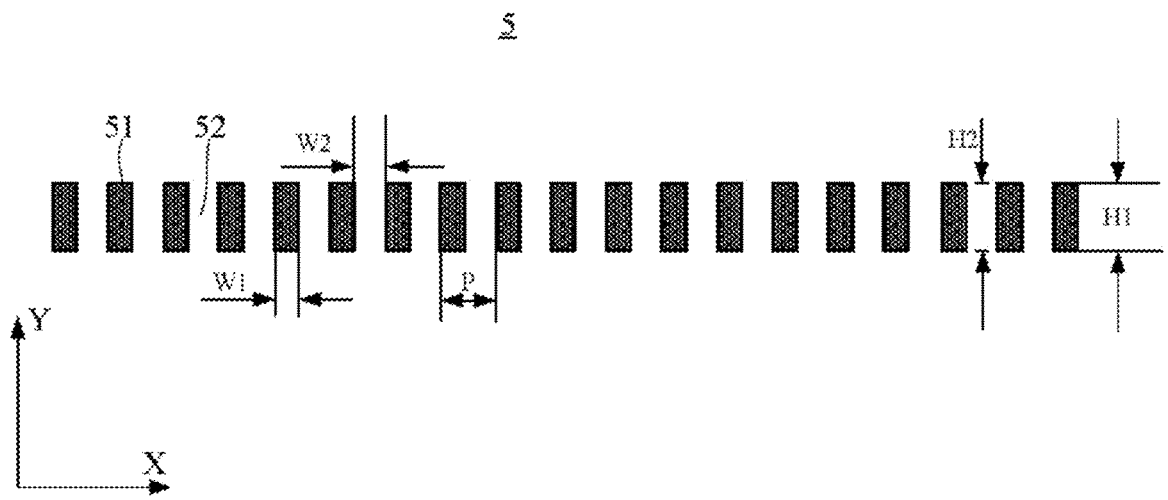
FIG. 5 is a schematic structural view of a wire grid polarizer according to embodiments of the present disclosure.

FIG. 5 is a schematic structural view of a wire grid polarizer according to embodiments of the present disclosure. Referring to FIGS. 2 and 5 in combination, the wire grid polarizer 5 may include a plurality of light shielding elements 51 arranged at intervals and gaps 52 which are respectively located between any two adjacent light shielding elements 51. For example, the light shielding element 51 may be made of a metal material such as aluminum or silver.

In the wire grid polarizer 5, the plurality of light shielding elements 51 and the plurality of gaps 52 are alternately arranged. With reference to FIGS. 1-3, the wire grid polarizer 5 has a pitch P, the light shielding element 51 has a width W1 in a direction perpendicular to a light-emitting direction (X direction in the drawings) and a thickness H1 in the light-emitting direction (Y direction in the drawings), and the gap 52 has a width W2 in the direction perpendicular to the light-emitting direction and a thickness H2 in the light-emitting direction. One light shielding element 51 and one gap 52 constitute a unit, and a plurality of units are periodically arranged in the direction perpendicular to the light emitting direction. A size of the unit formed by one light shielding element 51 and one gap 52 in the X direction is the pitch P. It should be understood that the pitch P is equal to a sum of the width W1 of the light shielding element 51 and the width W2 of the gap 52. In addition, a ratio of the width W1 of the light shielding element 51 to the pitch P is called as a duty ratio. Optionally, the thickness H1 of the light shielding element 51 is equal to the thickness H2 of the gap 52, and a thickness of the wire grid polarizer 5 in the light emitting direction may be represented by the thickness H1 of the light shielding element 51.

In the embodiments of the present disclosure, the light shielding element 51 is relatively long and thin. For example, the light shielding elements 5 are arranged in a substantially parallel manner, and the pitch P is smaller than a wavelength of light that is incident on the wire grid polarizer.

It should be understood that the pitch P, the duty ratio and the thickness of the wire grid polarizer 5 have a greater impact on performance of the wire grid polarizer. The performance includes polarization degree and transmittance of the wire grid polarizer, and a wavelength of light applied with the wire grid polarizer.

Through a large number of experiments, inventor has studied an influence of the pitch, the duty ratio and the thickness of the wire grid polarizer 5 on the polarization degree and the transmittance of blue light. Apart of experimental data is shown in Table 1~Table 3.

TABLE 1

Influence of the pitch P on polarization degree and transmittance of blue light

| pitch P/nm | polarization degree | transmittance |
|---|---|---|
| 40 | 99.9999% | 43.7720% |
| 50 | 99.9999% | 43.4653% |
| 80 | 99.9990% | 42.0039% |
| 100 | 99.9943% | 40.6417% |
| 120 | 99.9957% | 40.2171% |
| 140 | 99.9742% | 40.2013% |
| 150 | 99.9772% | 39.0102% |
| 200 | 99.3520% | 36.1003% |
| 250 | 92.0875% | 30.5608% |
| 300 | 88.5012% | 27.3971% |

TABLE 2

Influence of duty ratio on polarization degree and transmittance of blue light

| duty ratio | polarization degree | transmittance |
|---|---|---|
| 0.3 | 99.9324% | 47.2553% |
| 0.4 | 99.9949% | 43.8460% |
| 0.5 | 99.9943% | 40.6417% |
| 0.6 | 99.9997% | 36.9792% |
| 0.7 | 99.9999% | 26.4238% |
| 0.8 | 99.9999% | 17.8956% |

TABLE 3

Influence of thickness on polarization degree and transmittance of blue light

| thickness/nm | polarization degree | transmittance |
|---|---|---|
| 30 | 70.3771% | 47.6661% |
| 50 | 94.0952% | 40.5349% |
| 80 | 99.4075% | 40.8691% |
| 100 | 99.8314% | 40.9579% |
| 110 | 99.9315% | 41.6503% |
| 130 | 99.9833% | 41.5477% |
| 150 | 99.9943% | 40.6417% |

TABLE 3-continued

Influence of thickness on polarization
degree and transmittance of blue light

| thickness/nm | polarization degree | transmittance |
|---|---|---|
| 200 | 99.9999% | 38.9699% |
| 250 | 99.9999% | 37.6231% |
| 300 | 99.9999% | 36.2047% |

According to Table 1, as the pitch P increases, basically, the polarization degree of the wire grid polarizer 5 to blue light decreases and the transmittance to blue light also decreases. According to Table 2, as the duty ratio increases, basically, the polarization degree of the wire grid polarizer 5 to blue light increases and the transmittance to blue light decreases. According to Table 3, as the thickness increases, basically, the polarization degree of the wire grid polarizer 5 to blue light increases and the transmittance to blue light decreases.

In order to make the wire grid polarizer have a large polarization degree and transmittance to incident light (such as blue light), and to ensure the difficulty of processing the wire grid polarizer, in the embodiments of the present disclosure, the pitch P may be set in a range of 100~140 nm. When the pitch P is less than 100 nm, although a large polarization degree and a large transmittance may be obtained, processing of the wire grid polarizer is too difficult; when the pitch P is greater than 140 nm, the polarization degree and the transmittance of the wire grid polarizer are small. Further, the duty ratio may be about 0.5 to obtain a large polarization and a large transmittance. In addition, the thickness may be in a range of 150~200 nm to obtain a large polarization degree and a large transmittance.

Referring to FIG. 2, the buffer layer 4 may include a first buffer sub-layer 41 and a second buffer sub-layer 42. The first buffer sub-layer 41 is closer to the wire grid polarizer 5 than the second buffer sub-layer 42. In a process of forming the wire grid polarizer 5, a metal layer such as aluminum is usually etched by a dry etching process. The buffer layer 4 is arranged between the covering layer 3 and the wire grid polarizer 5, so that the buffer layer 4 may prevent the covering layer 3 from being damaged by the dry etching process, that is, the buffer layer 4 may also function as an etching stop layer.

Further, the first buffer sub-layer 41 may be composed of a low refractive index material, for example, the first buffer sub-layer 41 may be a silicon oxide layer. The second buffer sub-layer 42 may be composed of a high refractive index material, for example, the second buffer sub-layer 42 may be a silicon nitride layer. It should be understood that the low refractive index and the high refractive index here are relative concepts, which are intended to mean that the refractive index of the material of the first buffer sub-layer 41 is smaller than the refractive index of the material of the second buffer sub-layer 42. For example, the refractive index of the material of the first buffer sub-layer 41 may be in a range of 1.48~1.52, and the refractive index of the material of the second buffer sub-layer 42 may be about 1.8. In this way, a gradually-changed gradient in refractive index is formed on a light-emitting side of the wire grid polarizer 5, which may further improve light efficiency of the display panel. In addition, the second buffer sub-layer 42 is composed of silicon nitride, and the silicon nitride may function to stopping etching, so that the buffer layer may function as an etching stop layer.

Continuing to refer to FIG. 2, the protection layer 6 may include a first protection sub-layer 61 and a second protection sub-layer 62. The first protective sub-layer 61 is closer to the wire grid polarizer 5 than the second protective sub-layer 62. By providing the protective layer 6 on a side of the wire grid polarizer 5 away from the base substrate 1, the wire grid polarizer may be protected. In addition, the protective layer 6 may also play a role of planarization.

Further, the first protective sub-layer 61 may be composed of a low refractive index material, for example, the first protective sub-layer 61 may be a silicon oxide layer. The second protective sub-layer 62 may be composed of a high refractive index material, for example, the second protective sub-layer 62 may be a silicon nitride layer. It should be understood that the low refractive index and the high refractive index here are relative concepts, which are intended to mean that the refractive index of the material of the first protective sub-layer 61 is smaller than the refractive index of the material of the second protective sub-layer 62. For example, the refractive index of the material of the first protective sub-layer 61 may be in a range of 1.48~1.52, and the refractive index of the material of the second protective sub-layer 62 may be about 1.8. With such an arrangement, a gradually-changed gradient in refractive index is formed on a light incident side of the wire grid polarizer 5, which may further improve light efficiency of the display panel.

That is, in the embodiments of the present disclosure, the buffer layer 4, the wire grid polarizer 5 and the protective layer 6 together constitute a wire grid polarizer assembly. By designing thickness and refractive index of each film layer in the wire grid polarizer assembly, the transmittance of the wire grid polarizer assembly to blue light may be improved.

For example, in embodiments of the present disclosure, a central value of the thickness of the first buffer sub-layer 41 may be 290 nm. Limited by actual processing technology, an actual thickness value may fluctuate in a range of 290 nm±5%, that is, the thickness of the first buffer sub-layer 41 may be in a range of 275.5~304.5 nm. A central value of the thickness of the second buffer sub-layer 42 may be 100 nm. Limited by the actual processing technology, an actual thickness value may also fluctuate in a range of 100 nm±5%, that is, the thickness of the second buffer sub-layer 42 may be in a range of 95~105 nm. A central value of the thickness of the first protection sub-layer 61 may be 450 nm. Limited by the actual processing technology, an actual thickness value may fluctuate in a range of 450 nm±5%, that is, the thickness of the first protective sub-layer 61 may be in a range of 427.5~472.5 nm. A central value of the thickness of the second protective sub-layer 62 may be 50 nm. Limited by the actual processing technology, an actual thickness value may fluctuate in a range of 50 nm±5%, that is, the thickness of the second protective sub-layer 62 may be in a range of 47.5~52.5 nm.

Further, both the first buffer sub-layer 41 and the first protection sub-layer 61 may be silicon oxide layers, and the refractive index thereof may be in a range of 1.35~1.65, such as 1.44; and both the second buffer sub-layer 42 and the second protection sub-layer 62 may be silicon nitride layers, and the refractive index thereof may be in a range of 1.6~2.0, such as 1.8.

In addition, inventor also designs a set of comparative embodiments, in which specific parameters are shown in Table 4 below.

TABLE 4

Relationship between thickness and refractive index of each layer in wire grid polarizer assembly and transmittance

|  | comparative embodiments | | Embodiments of the present disclosure | |
|---|---|---|---|---|
|  | Refractive index | thickness (nm) | Refractive index | thickness (nm) |
| Second protective sub-layer | 1.8 | 50 | 1.8 | 50 |
| First protective sub-layer | 1.5 | 400 | 1.44 | 450 |
| First buffer sub-layer | 1.5 | 80 | 1.44 | 290 |
| Second buffer sub-layer | 1.8 | 100 | 1.8 | 100 |
| Blue light transmittance | 61% | | 80% | |

Figure 6:
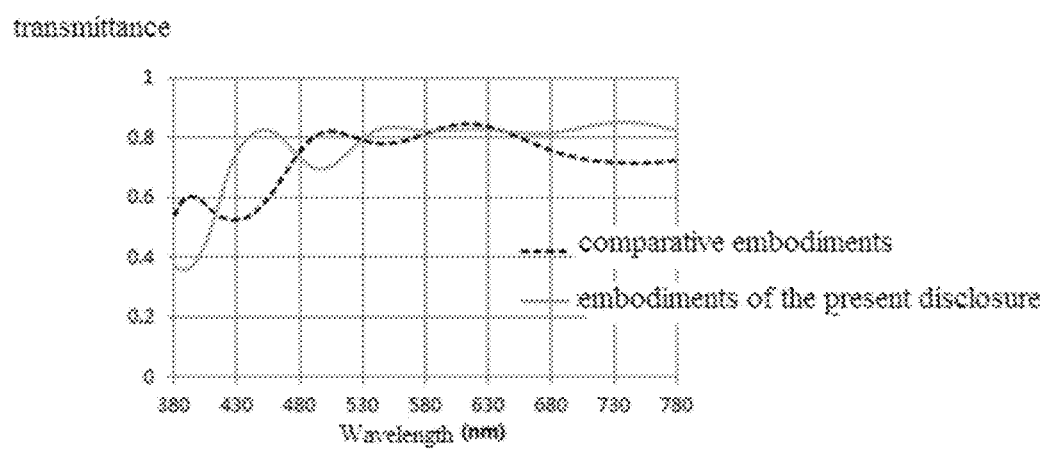
FIG. 6 is a transmittance graph of a wire grid polarizer assembly in embodiments of the present disclosure and a transmittance graph of a wire grid polarizer assembly in comparative embodiments.

FIG. 6 is a graph showing the transmittance of the wire grid polarizer assembly in the embodiments of the present disclosure and the comparative embodiments. By comparing the embodiments of the present disclosure and the comparative embodiments listed in Table 4 and referring to FIG. 6, it may be obtained: by designing the thickness and the refractive index of each film layer in the wire grid polarizer assembly to the above-mentioned value or value range, the transmittance of the wire grid polarizer assembly to blue light (within a wavelength range of about 435~480 nm) may be increased from 61% to 80%, which may further improve light efficiency of the display panel.

Optionally, the color filter substrate 10 may further include an alignment layer 7 on a side of the protective layer 6 away from the base substrate 1. For example, the alignment layer 7 may be composed of polyimide (PI). In the embodiments of the present disclosure, the second protective sub-layer 62 composed of silicon nitride is provided. Since an adhesive force between silicon nitride and PI is relatively large, an adhesion between the alignment layer 7 and the protective layer 6 may be increased, which is beneficial to coating the alignment layer.

Figure 7:
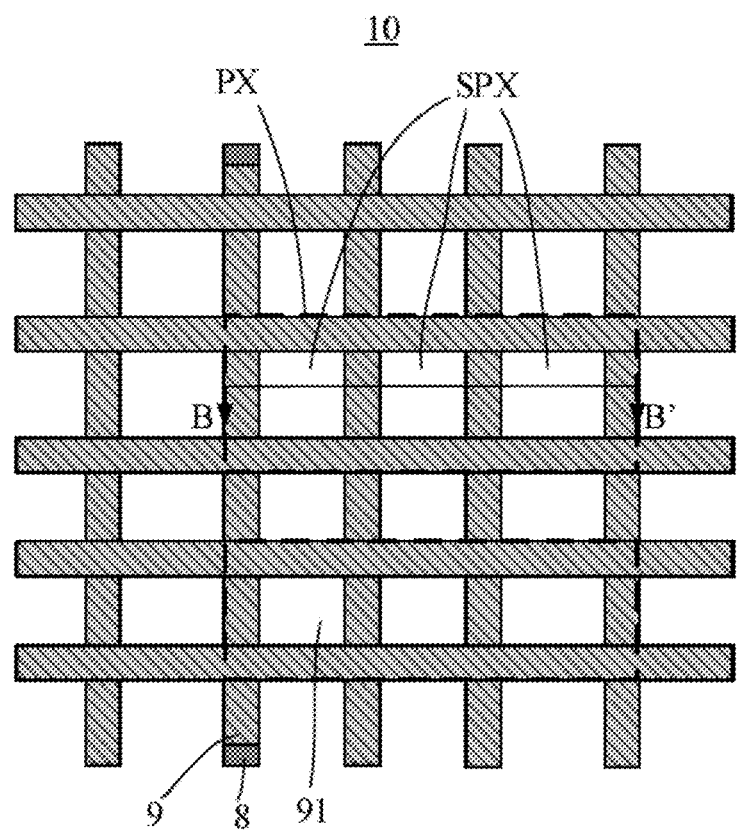
FIG. 7 is a partial plan view of a color filter substrate according to embodiments of the present disclosure.
Figure 8:
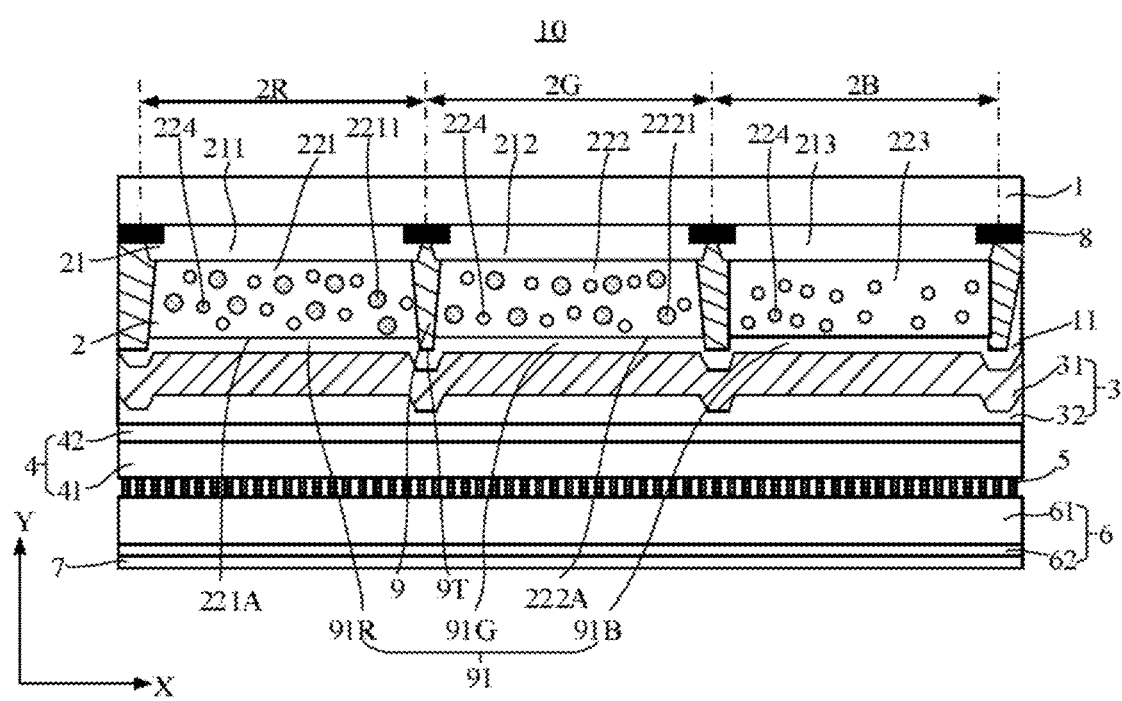
FIG. 8 is a cross-sectional view of the color filter substrate, taken along line BB' in FIG. 7, according to embodiments of the present disclosure.
Figure 9:
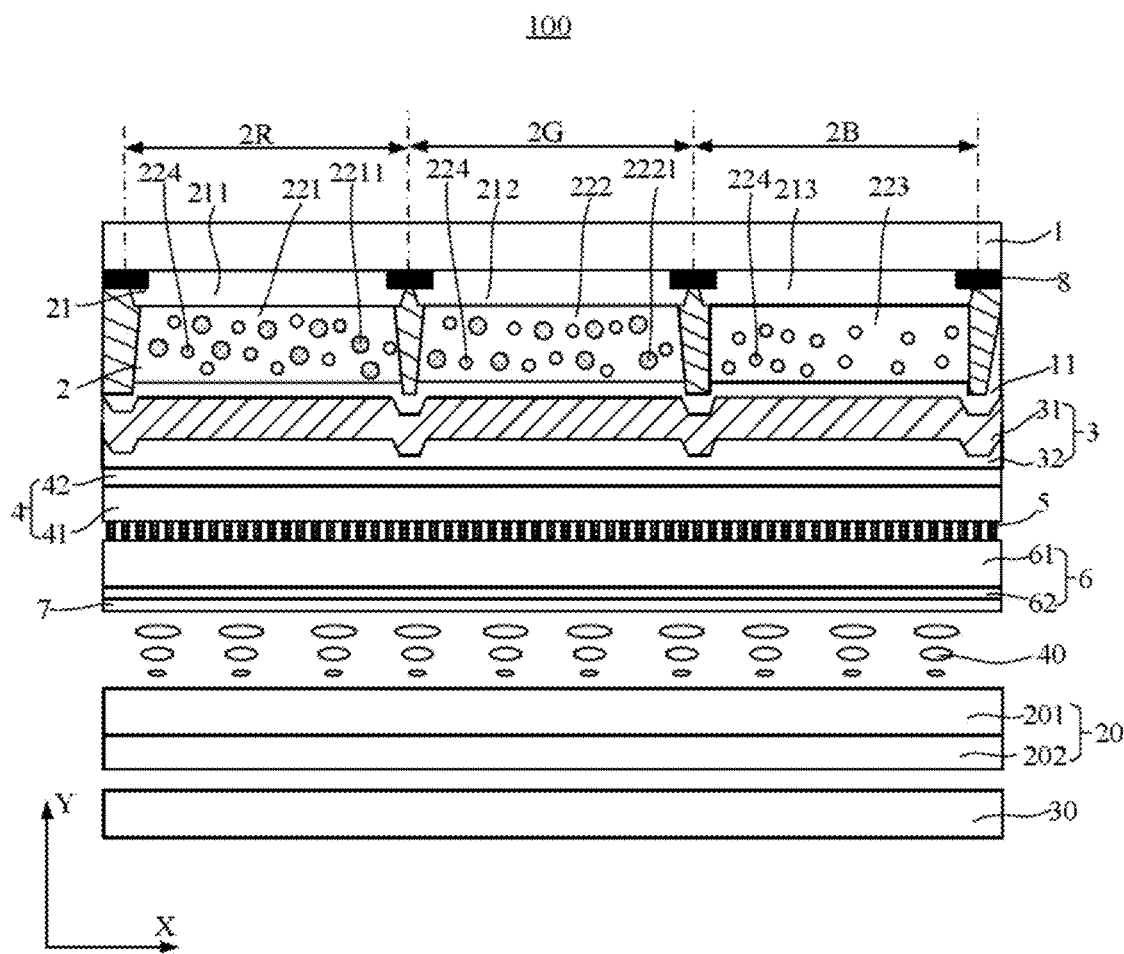
FIG. 9 is a schematic structural view of a display panel according to embodiments of the present disclosure.

FIG. 7 is a partial plan view of a color filter substrate according to embodiments of the present disclosure. FIG. 8 is a cross-sectional view of the color filter substrate, taken along line BB' in FIG. 7, according to embodiments of the present disclosure. FIG. 9 is a schematic structural view of a display panel according to embodiments of the present disclosure. Hereinafter, differences between the embodiments shown in FIGS. 7-9 and the above embodiments will be mainly described, and other structures in the embodiments shown in FIGS. 7-9 may refer to the above embodiments.

It should be noted that in the plan view shown in FIG. 7, in order to clearly show a black matrix and an isolation bank, the isolation bank 9 is schematically made to expose a part of the black matrix 8, but this does not mean that the isolation bank 9 must expose the part of black matrix 8; in addition, the black matrix 8 is shown with a gray color, but this does not mean that the black matrix 8 must be gray.

With reference to FIGS. 7-9, the color filter substrate 10 according to the embodiments of the present disclosure may include a base substrate 1, a color conversion layer 2, a covering layer 3, a buffer layer 4, a polarizing layer 5, a protective layer 6, an alignment layer 7, the isolation bank 9 and a barrier layer 11. The color conversion layer 2, the barrier layer 11, the covering layer 3, the buffer layer 4, the polarizing layer 5, the protective layer 6 and the alignment layer 7 are sequentially arranged on the base substrate 1 in a direction away from the base substrate 1. That is, the color conversion layer 2 is arranged on the base substrate 1, the barrier layer 11 is arranged on a side of the color conversion layer 2 away from the base substrate 1, the covering layer 3 is arranged on a side of the barrier layer 11 away from the base substrate 1, the buffer layer 4 is arranged on a side of the covering layer 3 away from the base substrate 1, the polarizing layer 5 is arranged on a side of the buffer layer 4 away from the base substrate 1, the protective layer 6 is arranged on a side of the polarizing layer 5 away from the base substrate 1, and the alignment layer 7 is arranged on a side of the protective layer 6 away from the base substrate 1.

As shown in FIGS. 7 and 8, a plurality of the isolation banks 9 are arranged on the base substrate 1 to form a plurality of grooves 91 on the base substrate 1.

For example, the color filter substrate 10 may also include the black matrix 8. It should be understood that the black matrix 8 may be configured to separate pixels and prevent light leakage and cross-color. The isolation bank 9 may be arranged on a side of the black matrix 8 away from the base substrate 1. An orthographic projection of the isolation bank 9 on the base substrate 1 overlaps with an orthographic projection of the black matrix 8 on the base substrate 1. Exemplarily, the orthographic projection of the isolation bank 9 on the base substrate 1 may substantially overlap with the orthographic projection of the black matrix 8 on the base substrate 1.

For example, a material of the isolation bank 9 may be a transparent material. Optionally, the material of the isolation bank 9 may be a black material, the black material has good absorption of light and may effectively reduce color mixing between multiple pixels. Optionally, the material of the isolation bank 9 may be a gray reflective material. For example, when the material of the isolation bank 9 is the transparent material or the gray reflective material, high refractive index scattering particles such as titanium oxide may be added to the material of the isolation bank 9. For example, a size of the scattering particles may be in a range of 60~500 nm, and a distribution concentration of the scattering particles may be in a range of 1%~15%. The distribution concentration of the scattering particles may be represented by a volume percentage of the scattering particles in the isolation bank. In this way, light reflection may be formed on an interface of the isolation bank 9, so that light efficiency may be improved, and color mixing between a plurality of sub-pixels may be effectively reduced.

Specifically, continuing to refer to FIG. 8, the color filter substrate 10 may include a first sub-pixel 2R, a second sub-pixel 2G, and a third sub-pixel 2B. The color filter substrate 10 may further include a filter layer 21, the filter layer 21 is arranged between the base substrate 1 and a layer where the quantum dot structure and the transparent structure are located. The filter layer 21 may include a plurality of filter structures for allowing light of different colors to pass therethrough. For example, the plurality of filter structures may be arranged in one-to-one correspondence with the plurality of sub-pixels. As shown in FIG. 8, the filter layer 21 may include a first filter structure 211, a second filter structure 212 and a third filter structure 213.

The isolation bank 9 encloses the plurality of grooves 91 on a side of the filter layer 21 away from the base substrate 1. For example, the plurality of grooves 91 may include a first groove 91R, a second groove 91G, and a third groove 91B. A first quantum dot structure 221 is located in the first groove 91R, a second quantum dot structure 222 is located in the second groove 91G, and a transparent structure 223 is located in the third groove 91B. That is, the first sub-pixel 2R may include the first quantum dot structure 221 in the first groove 91R, the second sub-pixel 2G may include the second quantum dot structure 222 in the second groove 91G, and the third sub-pixel 2B may include the transparent structure 223 in the third groove 91B.

In the embodiments of the present disclosure, by providing isolation banks, the color conversion layer (in particular, the quantum dot structure) may be formed by a printing process (i.e., an Ink process).

Figure 11:
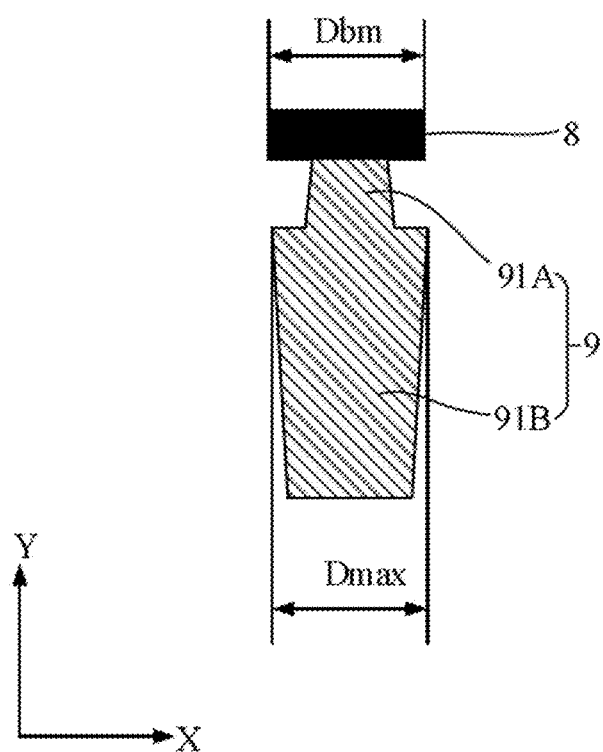
FIG. 11 is a partial enlarged view of isolation bank and black matrix of the color filter substrate according to embodiments of the present disclosure.

FIG. 11 is a partial enlarged view of an isolation bank and a black matrix of a color filter substrate according to embodiments of the present disclosure. In an exemplary embodiment, the isolation bank 9 may have a "mushroom" shape. Referring to FIG. 11, the isolation bank 9 may include a neck portion 91A and a body portion 91B. For example, a cross section of the body portion 91B in XY plane may be trapezoidal, that is, the body portion 91B has a maximum width Dmax, as shown in FIG. 11. A width of the neck portion 91A is smaller than the maximum width Dmax of the body portion 91B. As shown in FIG. 11, a part of the black matrix 8 between two sub-pixels may have a width Dbm. Optionally, the maximum width Dmax of the body portion 91B is substantially equal to the width Dbm of the black matrix 8.

Figure 10:
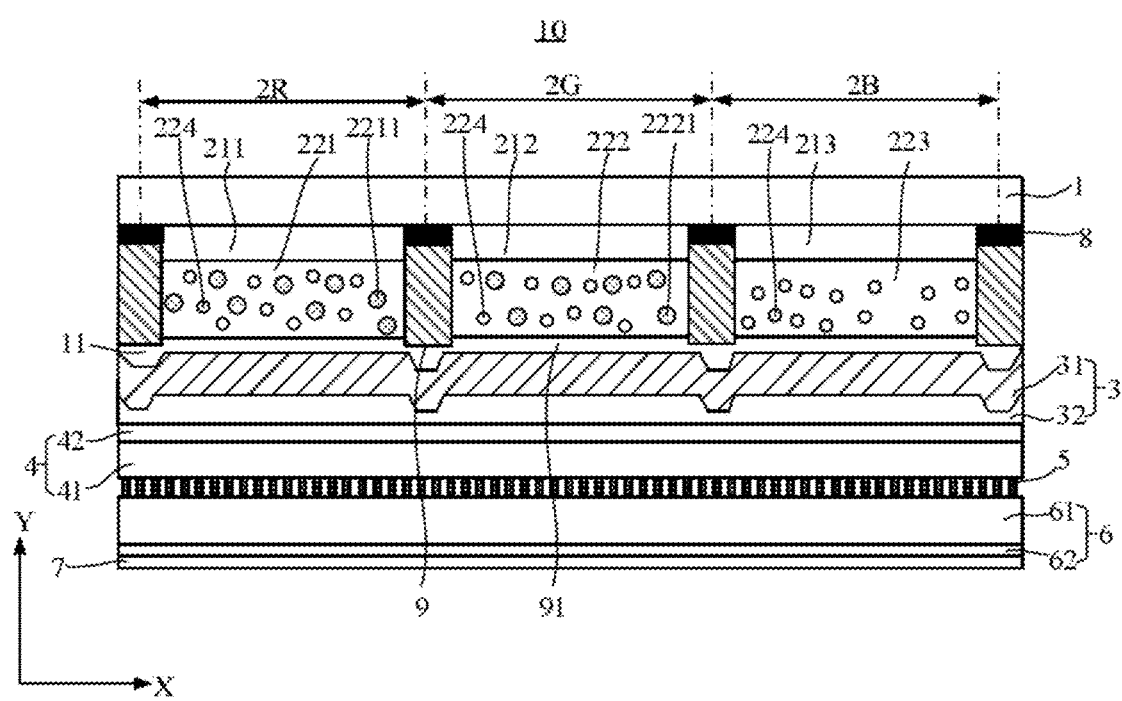
FIG. 10 is a cross-sectional view of a color filter substrate, taken along the line BB' in FIG. 7, according to other embodiments of the present disclosure.

Optionally, in the embodiments shown in FIG. 10, an isolation bank 9 may have a columnar shape, for example, die isolation bank 9 extends in Y direction with equal width. And a width of the isolation bank 9 may be equal to a width of a part of a black matrix 8 between two sub-pixels.

In the embodiments of the present disclosure, a thickness of the isolation bank 9 may be greater than a sum of thickness of the color conversion layer 2 and thickness of the filter layer 21. In this way, a depth of the formed groove 91 may be greater than the thickness of the color conversion layer 2, thereby facilitating forming the color conversion layer through a printing process.

For example, the thickness of the filter layer 21 may be in a range of 2.1~3.0 μm, and the thickness of the color conversion layer 2 may be in a range of 5~10 μm, so the thickness of the isolation bank 9 may be in a range of 7.1~13 μm.

As shown in FIG. 8, the isolation bank 9 includes a first isolation bank top surface 9T away from the base substrate 1, the first quantum dot structure 221 has a first top surface 221A away from the base substrate 1, the second quantum dot structure 222 has a second top surface 222A away from the base substrate 1, and the first isolation bank top surface 9T is farther away from the base substrate 1 than each of the first top surface 221A and the second top surface 222A.

Referring to FIG. 8, the barrier layer 11 is arranged between the color conversion layer 2 and the covering layer 3, specifically, the barrier layer 11 is arranged between the first covering sub-layer 31 and a layer where the quantum dot structures 221, 222 and the transparent structure 223 are located. The barrier layer 11 may protect the quantum dot structures (including QD Ink) formed by the printing process from corrosion by water and oxygen, that is, the barrier layer 11 may be configured to resist water and oxygen. For example, the barrier layer 11 may be a silicon oxide layer, a thickness of the silicon oxide layer may be in a range of 300~400 nm, and its water and oxygen barrier capacity may be lower than $10^{-5}$. In addition, since the barrier layer 11 is made of a low refractive index material such as silicon oxide, it may further improve light efficiency of the display panel.

It should be noted that in the embodiments shown in FIGS. 1 to 4, a quantum dot layer is formed by a photolithography process, and the quantum dot layer may protect the quantum dots without the barrier layer. Of course, it is also possible to arrange the barrier layer in the embodiments shown in FIGS. 1 to 4 according to actual needs.

Figure 12:
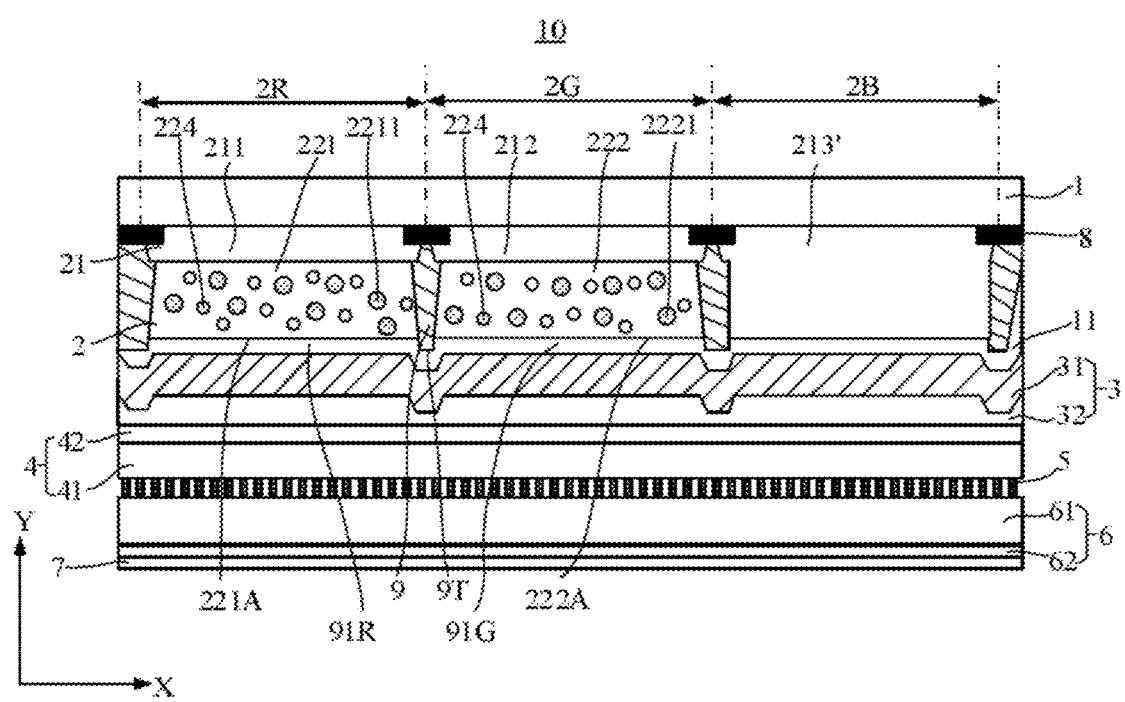
FIG. 12 is a cross-sectional view of a color filter substrate, taken along the line BB' in FIG. 7, according to other embodiments of the present disclosure.

FIG. 12 is a schematic structural view of a color filter substrate according to embodiments of the present disclosure. Hereinafter, differences between the embodiments shown in FIG. 12 and the above embodiments will be mainly described, and other structures in the embodiments shown in FIG. 12 may refer to the above embodiments.

Referring to FIG. 12, a first sub-pixel 2R includes a first filter structure 211 and a first quantum dot structure 221, a second sub-pixel 2G includes a second filter structure 212 and a second quantum dot structure 222, and a third sub-pixel 2B includes a third filter structure 213'.

A thickness of the first filter structure 211 may be equal to a thickness of the second filter structure 212. A thickness of the first quantum dot structure 221 may be equal to a thickness of the second quantum dot structure 222. A thickness of the third filter structure 213' may be equal to a sum of the thickness of the first filter structure 211 and the thickness of the first quantum dot structure 221.

That is, in the embodiment, in the third sub-pixel 2B, an integral third filter structure 213' is provided, instead of filter structure combined with transparent structure. In this way, the third filter structure 213' may allow the light of the third color (for example, blue light) to pass therethrough.

Referring to FIGS. 7-12, there is a difference in thickness between the isolation bank and the quantum dot structure, between the isolation bank and the transparent structure, or between the isolation bank and the third filter structure 213', that is, there is a difference in height. For example, the difference in height may be in a range of 5~15 μm. The difference in height causes a surface of the barrier layer 11 away from the base substrate 1 to form an uneven surface.

Referring to FIGS. 8-12, the covering layer 3 may include a first cover sub-layer 31 and a second cover sub-layer 32. The first covering sub-layer 31 is arranged on a surface of the barrier layer 11 away from the base substrate 1, and the second covering sub-layer 32 is arranged on a surface of the first covering sub-layer 31 away from the base substrate 1. By providing the covering layer, the difference in height may be eliminated to form a flattened surface. For example, a thickness of the first covering sub-layer 31 is greater than or equal to a thickness of the second covering sub-layer 32. Exemplarily, the thickness of the first covering sub-layer 31 may be 1~4 times the thickness of the second covering sub-layer 32, for example, the thickness of the first covering sub-layer 31 may be twice the thickness of the second covering sub-layer 32. Through such thickness matching, the difference in height may be well eliminated, so that a surface of the covering layer away from the base substrate is flat.

It should be noted that the first covering sub-layer 31 and the second covering sub-layer 32 may refer to the above description, which will not be repeated here.

Figure 13:
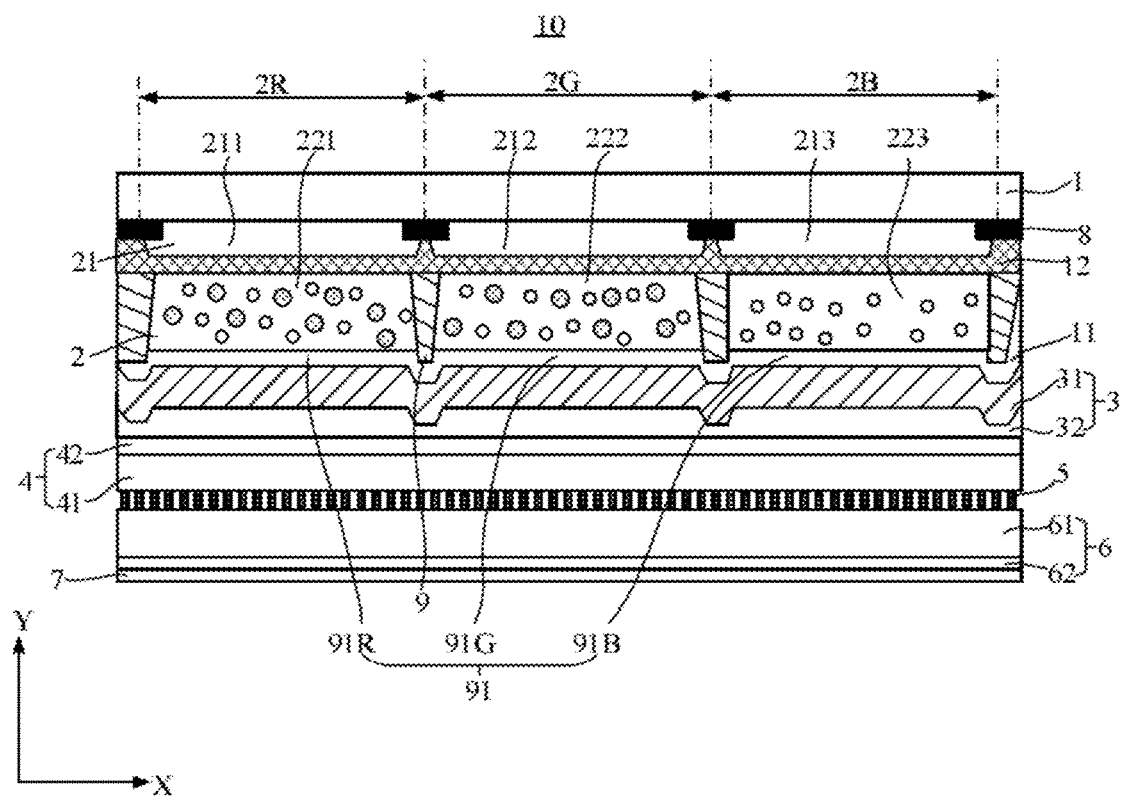
FIG. 13 is a cross-sectional view of a color filter substrate, taken along the line BB' in FIG. 7, according to other embodiments of the present disclosure.

FIG. 13 is a schematic structural view of a color filter substrate according to embodiments of the present disclosure. Hereinafter, differences between the embodiments shown in FIG. 13 and the above embodiments will be mainly described, and other structures in the embodiments shown in FIG. 13 may refer to the above embodiments.

Referring to FIG. 13, the color filter substrate 10 according to the embodiments of the present disclosure may include a base substrate 1, a filter layer 21, a planarization layer 12, a color conversion layer 2, a covering layer 3, a buffer layer 4, a polarizing layer 5, a protective layer 6, an alignment layer 7, an isolation bank 9 and a barrier layer 11.

The filter layer 21, the planarization layer 12, the color conversion layer 2, the barrier layer 11, the covering layer 3, the buffer layer 4, the polarizing layer 5, the protective layer 6, and the alignment layer 7 are sequentially arranged on the base substrate 1 in a direction away from the base substrate 1. That is, the filter layer 21 is arranged on the base substrate 1, the planarization layer 12 is arranged on a side of the filter layer 21 away from the base substrate 1, the color conversion layer 2 is arranged on a side of the planarization layer 12 away from the base substrate 1, the barrier layer 11 is arranged on a side of the color conversion layer 2 away from the base substrate 1, the covering layer 3 is arranged on a side of the barrier layer 11 away from the base substrate 1, the buffer layer 4 is arranged on a side of the covering layer 3 away from the base substrate 1, the polarizing layer 5 is arranged on a side of the buffer layer 4 away from the base substrate 1, the protective layer 6 is arranged on a side of the polarizing layer 5 away from the base substrate 1, and the alignment layer 7 is arranged on a side of the protective layer 6 away from the base substrate 1.

As shown in FIG. 13, the filter layer 21 may include a first filter structure 211, a second filter structure 212 and a third filter structure 213. It should be understood that a first sub-pixel 2R includes the first filter structure 211, a second sub-pixel 2G includes the second filter structure 212, and a third sub-pixel 2B includes the third filter structure 213. The first filter structure 211 is configured to allow the light of the first color to pass therethrough, the second filter structure 212 is configured to allow the light of the second color to pass therethrough, the third filter structure 213 is configured to allow the light of the third color to pass therethrough.

The color filter substrate 10 may also include a black matrix 8. It should be understood that the black matrix 8 may be configured to separate pixels and prevent light leakage and cross-color.

Referring to FIG. 13, there is a gap between two adjacent sub-pixels. That is, the first filter structure 211 of the first sub-pixel 2R and the second filter structure 212 of the second sub-pixel 2G are arranged at intervals, and the second filter structure 212 of the second sub-pixel 2G and the third filter structure 213 of the third sub-pixel 2B are arranged at intervals. Due to the gap, there is a difference in height between adjacent sub-pixels. Since a thickness of the filter layer 21 is small, the difference in height is also small.

Continuing to refer to FIG. 13, the planarization layer 12 is arranged on the side of the filter layer 21 away from the base substrate 1 to substantially eliminate the difference in height between the sub-pixels.

Continuing to refer to FIG. 13, a plurality of the isolation banks 9 are arranged on the surface of the planarization layer 12 away from the base substrate 1, so as to form a plurality of grooves 91 on the side of the planarization layer 12 away from the base substrate 1. The quantum dot structures are filled in the plurality of grooves 91, respectively.

Specifically, the plurality of grooves 91 may include a first groove 91R, a second groove 91G, and a third groove 91B. The color conversion layer 2 may include a first quantum dot structure 221 and a second quantum dot structure 222. The first sub-pixel 2R may include the first quantum dot structure 221 in the first groove 91R, and the second sub-pixel 2G may include the second quantum dot structure 222 in the second groove 91G. Referring to FIG. 12, the third sub-pixel 2B may include a transparent structure 223 in the third groove 91B.

In the embodiments, thicknesses of the first quantum dot structure 221, the second quantum dot structure 222 and the transparent structure 223 may be equal to one another. A thickness of the isolation bank 9 may be greater than the thickness of any one of the first quantum dot structure 221, the second quantum dot structure 222 and the transparent structure 223. For example, the thickness of any one of the first quantum dot structure 221, the second quantum dot structure 222 and the transparent structure 223 may be in a range of 5~15 μm.

In the embodiments, by providing the isolation bank, the color conversion layer (in particular, the quantum dot structure) may be formed by a printing process (i.e., an Ink process).

Referring back to FIGS. 3 and 9, the display panel 100 according to embodiments of the present disclosure may include a color filter substrate 10, an array substrate 20, a backlight module 30, and a liquid crystal layer 40 between the color filter substrate 10 and the array substrate 20.

It should be understood that since the display panel 100 includes the color filter substrate 10 as described above, the display panel 100 should have all structures and advantages of the color filter substrate 10 as described above, which will not be repeated here.

As shown in FIGS. 3 and 9, the array substrate 20 may include: a base substrate 201; and a polarization member 202 on the base substrate 201. The polarization member 202 may be located on a surface of the base substrate 201 facing away from the color filter substrate. The polarization member 202 is configured to convert light emitted by the backlight module 30 into linearly polarized light. In some embodiments of the present disclosure, the polarization member 202 may be a polarizing film.

It should be understood that the array substrate 20, the backlight module 30, and the liquid crystal layer 40 may adopt structures of array substrate, backlight module, and liquid crystal layer known in the art, which will not be repeated here.

Figure 14:
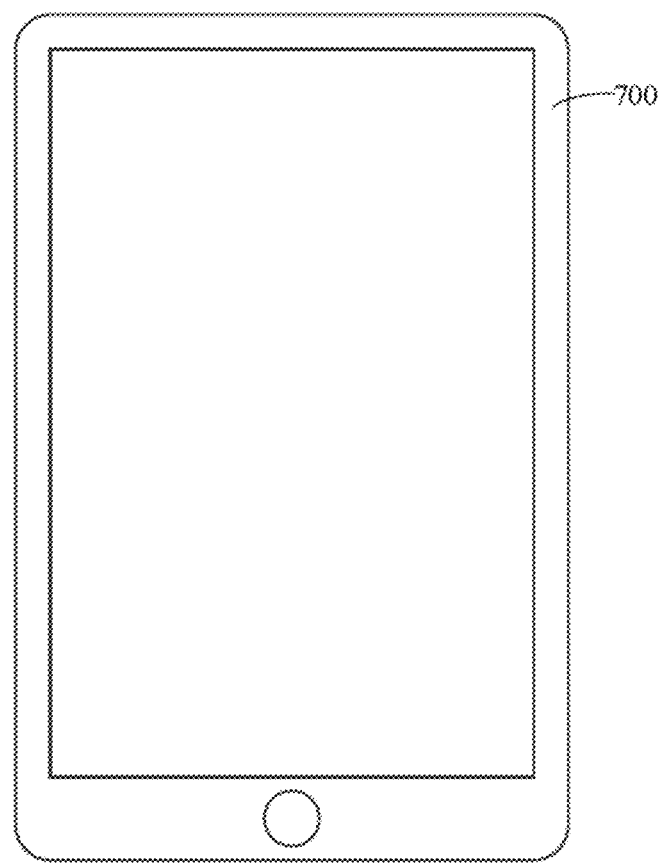
FIG. 14 is a plan view of a display device according to embodiments of the present disclosure.

The embodiments of the present disclosure also provide a display device, including the display panel according to the above-mentioned embodiments. As shown in FIG. 14, which shows a plan view of a display device according to embodiments of the present disclosure, the display device 700 may include the display panel as described in any one of the above embodiments. For example, the display device may be any product with a display function, such as a smart phone, a wearable smart watch, smart glasses, a tablet computer, a television, a monitor, a notebook computer, a digital photo frame, a navigator, a car monitor, an e-book, etc.

Figure 15:
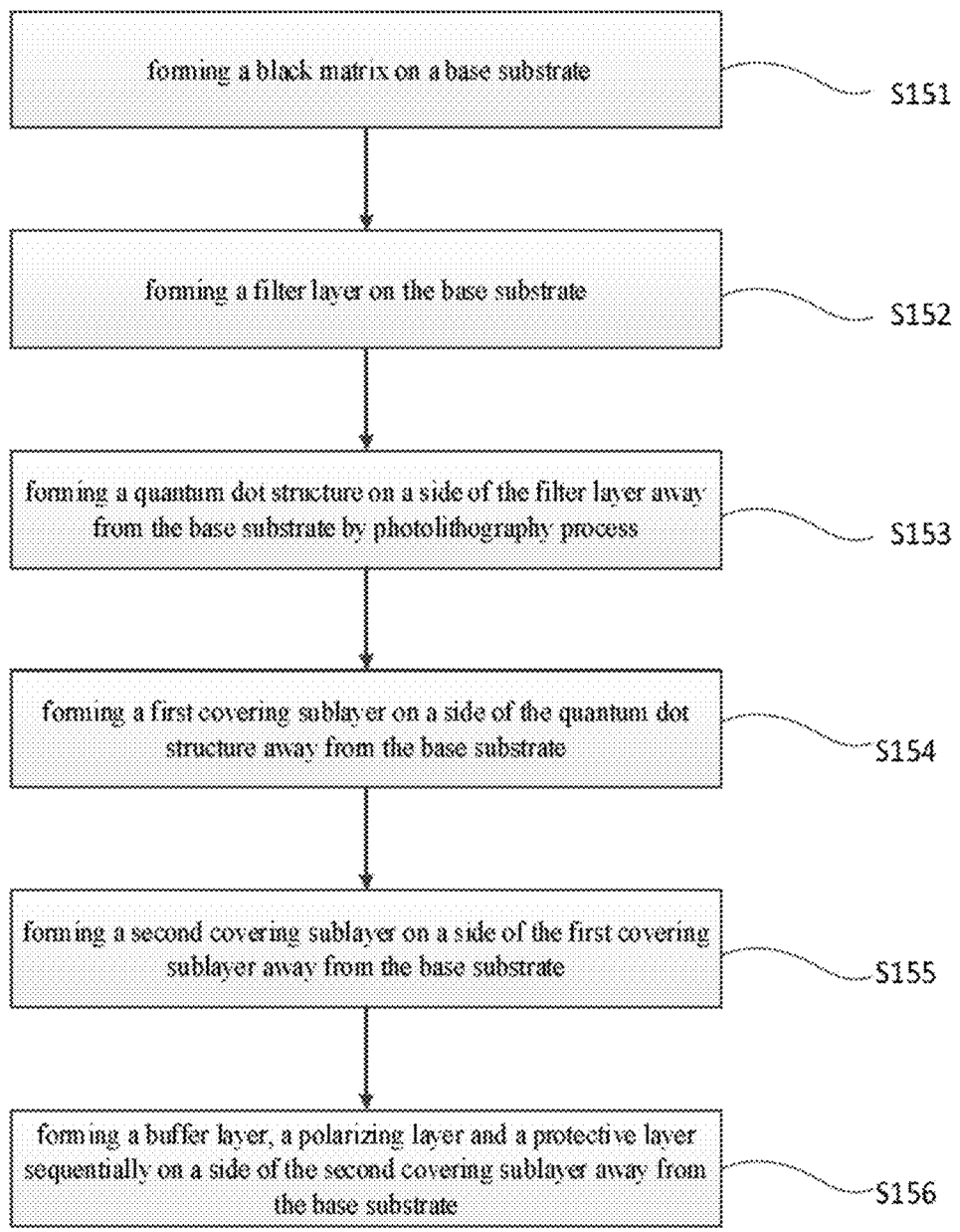
FIG. 15 is a flowchart of a method for manufacturing a color filter substrate according to embodiments of the present disclosure.

FIG. 15 is a flowchart of a method for manufacturing a color filter substrate according to embodiments of the present disclosure. With reference to FIGS. 2, 4 and 15 in combination, the manufacturing method may include at least following steps.

In step S151, a black matrix 8 is formed on a base substrate 1.

In step S152, a filter layer 21 is formed on the base substrate 1. For example, the filter layer 21 may include a first filter structure 211, a second filter structure 212, and a third filter structure 213 or 213'. Exemplarily, the first filter structure 211 is configured to allow light of a first color to pass therethrough, for example, the first filter structure 211 may be a red color film. The second filter structure 212 is configured to allow light of a second color to pass therethrough, for example, the second filter structure 212 may be a green color film. The third filter structure 213 or 213' is configured to allow light of a third color to pass therethrough, for example, the third filter structure 213 or 213' may be a blue color film.

For example, the first filter structure 211, the second filter structure 212 and the third filter structure 213 or 213' may be formed by a photolithography process.

In step S153, a quantum dot structure is formed on a side of the filter layer 21 away from the base substrate 1.

For example, a first quantum dot structure 221 and a second quantum dot structure 222 may be formed by the photolithography process. The first quantum dot structure 221 corresponds to the first filter structure 211, and the first quantum dot structure 221 and the first filter structure 211 may be formed by the same mask. The second quantum dot structure 222 corresponds to the second filter structure 212, and the second quantum dot structure 222 and the second filter structure 212 may be formed by the same mask.

Optionally, a transparent structure 223 corresponding to the third filter structure 213 may also be formed on a side of the filter layer 21 away from the base substrate 1.

In step S154, a first covering sub-layer 31 is formed on a side of the quantumn dot structure away from the base substrate 1.

For example, a first covering material may be coated by spin coating or knife coating. For example, the first covering material includes components such as silicone resin, acrylic resin, isopropanol, hardener, and silicon dioxide. Then, the first covering material is cured by thermal curing to form the first covering sub-layer 31. For example, a curing temperature may be about 150° C.

In step S155, a second covering sub-layer 32 is formed on a side of the first covering sub-layer 31 away from the base substrate 1.

For example, a second covering material may be coated by spin coating. For example, the second covering material includes components such as acrylic resin, isopropanol, hardener, silicon dioxide, and photoinitiator. Then, the second covering material is flattened by a nano-imprint process. The second covering material is cured by light curing to form the second covering sub-layer 32. For example, ultraviolet light may be configured to cure the second covering material.

In step S156, a buffer layer 4, a polarizing layer 5 and a protective layer 6 are sequentially formed on a side of the second covering sub-layer 32 away from the base substrate 1.

Figure 16:
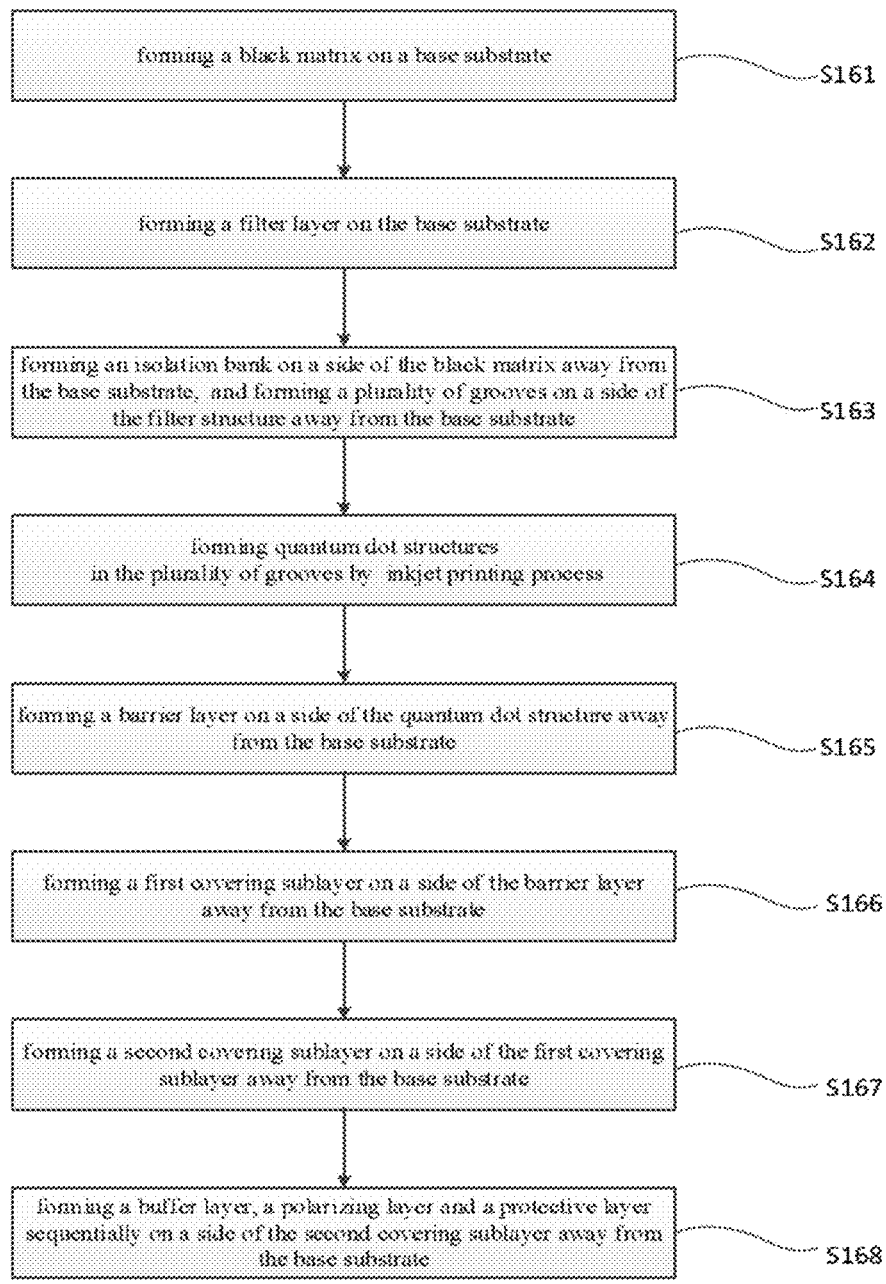
FIG. 16 is a flowchart of a method for manufacturing a color filter substrate according to other embodiments of the present disclosure.

FIG. 16 is a flowchart of a method for manufacturing a color filter substrate according to embodiments of the present disclosure. With reference to FIGS. 8 and 16 in combination, the manufacturing method may include at least following steps.

In step S161, a black matrix 8 is formed on a base substrate 1.

In step S162, a filter layer 21 is formed on the base substrate 1. For example, the filter layer 21 may include a first filter structure 211, a second filter structure 212, and a third filter structure 213 or 213'.

In step S163, an isolation bank 9 is formed on a side of the black matrix 8 away from the base substrate 1. The isolation bank 9 is located between two adjacent filter structures to form a plurality of grooves 91 on a side of the filter structure away from the base substrate 1.

In step S164, quantum dot structures are formed in the plurality of grooves 91, respectively.

For example, a first quantum dot structure 221 and a second quantum dot structure 222 may be formed by an inkjet printing process. The first quantum dot structure 221 corresponds to the first filter structure 211, and the second quantum dot structure 222 corresponds to the second filter structure 212.

Optionally, a transparent structure 223 corresponding to the third filter structure 213 may also be formed on a side of the filter layer 21 away from the base substrate 1.

In step S165, a barrier layer 11 is formed on a side of the quantum dot structure away from the base substrate 1.

In step S166, a first covering sub-layer 31 is formed on a side of the barrier layer 11 away from the base substrate 1.

For example, a first covering material may be coated by spin coating or knife coating. For example, the first covering material includes components such as silicone resin, acrylic resin, isopropanol, hardener, and silicon dioxide. Then, the first covering material is cured by thermal curing to form the first covering sub-layer 31. For example, a curing temperature may be about 150° C.

In step S167, a second covering sub-layer 32 is formed on a side of the first covering sub-layer 31 away from the base substrate 1.

For example, a second covering material may be coated by spin coating. For example, the second covering material includes components such as acrylic resin, isopropanol, hardener, silicon dioxide, and photoinitiator. Then, the second covering material is flattened by a nano-imprint process. The second covering material is cured by light curing to form the second covering sub-layer 32. For example, ultraviolet light may be configured to cure the second covering material.

In step S168, a buffer layer 4, a polarizing layer 5 and a protective layer 6 are sequentially formed on a side of the second covering sub-layer 32 away from the base substrate 1.

Although some embodiments of general inventive concept of the present disclosure have been illustrated and described, those of ordinary skill in the art will understand that these embodiments may be changed without departing from the principle and spirit of the general inventive concept of the present disclosure. The scope of the present disclosure is defined by the claims and their equivalents.

What is claimed is:

1. A color filter substrate, comprising:
    a base substrate;
    a color conversion layer on the base substrate;
    a covering layer on a side of the color conversion layer away from the base substrate; and
    a polarizing layer on a side of the covering layer away from the base substrate,
    wherein the polarizing layer comprises a wire grid polarizer;
    wherein the covering layer comprises a first covering sub-layer and a second covering sub-layer, the first covering sub-layer is located on the side of the color conversion layer away from the base substrate, the second covering sub-layer is located on a side of the first covering sub-layer away from the base substrate, and a material of the first covering sub-layer is different from a material of the second covering sub-layer; and
    wherein the second covering sub-layer at least comprises a photoinitiator, and a difference in height of the second covering sub-layer is less than or equal to 100 nanometers.

2. The color filter substrate of claim 1, further comprising a buffer layer between the covering layer and the polarizing layer, wherein the buffer layer comprises a first buffer sub-layer and a second buffer sub-layer, the first buffer sub-layer is arranged on a side of the wire grid polarizer close to the base substrate, the second buffer sub-layer is arranged on a side of the first buffer sub-layer close to the base substrate, and a refractive index of a material of the first buffer sub-layer is smaller than a refractive index of a material of the second buffer sub-layer.

3. The color filter substrate of claim 2, further comprising a protective layer on a side of the polarizing layer away from the base substrate, wherein the protective layer comprises a first protective sub-layer and a second protective sub-layer, the first protective sub-layer is arranged on a side of the wire grid polarizer away from the base substrate, the second protection sub-layer is arranged on a side of the first protection sub-layer away from the base substrate, and a refractive index of a material of the first protective sub-layer is smaller than a refractive index of a material of the second protective sub-layer.

4. The color filter substrate of claim 1, further comprising a filter layer on a side of the color conversion layer close to the base substrate,
wherein the filter layer comprises a first filter structure, a second filter structure, and a third filter structure, the first filter structure is configured to filter light within a first wavelength range, the second filter structure is configured to filter light within a second wavelength range, the third filter structure is configured to filter light within a third wavelength range, and the first wavelength range, the second wavelength range, and the third wavelength range are different from one another.

5. The color filter substrate of claim 4, wherein the color conversion layer comprises a first quantum dot structure and a second quantum dot structure, the first quantum dot structure is configured to convert the light within the third wavelength range into the light within the first wavelength range, the second quantum dot structure is configured to convert the light within the third wavelength range into the light within the second wavelength range; and
wherein the color filter substrate comprises a plurality of pixels, each pixel comprises at least a first sub-pixel, a second sub-pixel and a third sub-pixel, the first sub-pixel comprises the first quantum dot structure and the first filter structure, the second sub-pixel comprises the second quantum dot structure and the second filter structure, and the third sub-pixel comprises the third filter structure.

6. The color filter substrate of claim 5, wherein the third sub-pixel further comprises a transparent structure, the transparent structure is configured to allow the light within the third wavelength range, that is incident thereon, to pass therethrough, and the transparent structure is located on a side of the third filter structure away from the base substrate.

7. The color filter substrate of claim 5, wherein an orthographic projection of the first quantum dot structure on the base substrate falls within an orthographic projection of the first filter structure on the base substrate, and an orthographic projection of the second quantum dot structure on the base substrate falls within an orthographic projection of the second filter structure on the base substrate.

8. The color filter substrate of claim 6, wherein an orthographic projection of the transparent structure on the base substrate falls within an orthographic projection of the third filter structure on the base substrate,
a thickness of the first filter structure, a thickness of the second filter structure, and a thickness of the third filter structure are equal to one another, a thickness of the first quantum dot structure, a thickness of the second quantum dot structure and a thickness of the transparent structure are equal to one another, and
the thickness of the first filter structure is smaller than the thickness of the first quantum dot structure.

9. The color filter substrate of claim 5, wherein a thickness of the first filter structure is equal to a thickness of the second filter structure, a thickness of the first quantum dot structure is equal to a thickness of the second quantum dot structure, a thickness of the third filter structure is equal to a sum of thicknesses of the first filter structure and the first quantum dot structure, and
the thickness of the first filter structure is smaller than the thickness of the first quantum dot structure.

10. The color filter substrate of claim 1, wherein a thickness of the first covering sub-layer is greater than a thickness of the second covering sub-layer.

11. The color filter substrate of claim 3, wherein a pitch of the wire grid polarizer is within a range of 100~140 nm; and/or,
a duty ratio of the wire grid polarizer is equal to 0.5; and/or,
a thickness of the wire grid polarizer is within a range of 150~200 nm.

12. The color filter substrate of claim 11, wherein a thickness of the first buffer sub-layer is within a range of 275.5~304.5 nm, and a thickness of the second buffer sub-layer is within a range of 95~105 nm; and/or,
a thickness of the first protective sub-layer is within a range of 427.5~472.5 nm, and a thickness of the second protective sub-layer is within a range of 47.5~52.5 nm; and/or,
the refractive indices of the first buffer sub-layer and the first protective sub-layer are both within a range of 1.35~1.65; and/or,
the refractive indices of the second buffer sub-layer and the second protection sub-layer are both within a range of 1.6~2.0.

13. The color filter substrate of claim 5, wherein the color filter substrate further comprises a black matrix and an isolation bank, the black matrix is located on a side of the filter layer close to the base substrate, and the isolation bank is located on a side of the black matrix away from the base substrate, so that a plurality of grooves are formed on a side of the filter layer away from the base substrate; and
the plurality of grooves comprise a first groove in the first sub-pixel and a second groove in the second sub-pixel, the first quantum dot structure is located in the first groove, and the second quantum dot structure is located in the second groove.

14. The color filter substrate of claim 5, wherein the color filter substrate further comprises a black matrix, an isolation bank and a planarization layer, the black matrix is located on a side of the filter layer close to the base substrate, the planarization layer is located on a side of the filter layer away from the base substrate, and the isolation bank is located on a side of the planarization layer away from the base substrate, so that a plurality of grooves are formed on the side of the planarization layer away from the base substrate; and
the plurality of grooves comprise a first groove in the first sub-pixel and a second groove in the second sub-pixel, the first quantum dot structure is located in the first groove, and the second quantum dot structure is located in the second groove.

15. The color filter substrate of claim 13, wherein the isolation bank comprises a first isolation bank top surface away from the base substrate, the first quantum dot structure comprises a first top surface away from the base substrate, the second quantum dot structure comprises a second top surface away from the base substrate, and the first isolation bank top surface is farther from the base substrate than each of the first top surface and the second top surface.

16. The color filter substrate of claim 15, further comprising a barrier layer, wherein the barrier layer is located between the covering layer and a layer where the first quantum dot structure and the second quantum dot structure are located.

17. The color filter substrate of claim 13, wherein an orthographic projection of the isolation bank on the base substrate overlaps an orthographic projection of the black matrix on the base substrate.

18. The color filter substrate of claim 5, wherein the first quantum dot structure comprises a first bottom surface close to the base substrate and a first top surface away from the base substrate, and an orthographic projection of the first bottom surface on the base substrate falls within an orthographic projection of the first top surface on the base substrate; and/or,
    the second quantum dot structure comprises a second bottom surface close to the base substrate and a second top surface away from the base substrate, and an orthographic projection of the second bottom surface on the base substrate falls within the orthographic projection of the second top surface on the base substrate.

\* \* \* \* \*